(12) United States Patent
Lucas

(10) Patent No.: US 11,122,905 B2
(45) Date of Patent: Sep. 21, 2021

(54) SEAT WITH PRIVACY SCREEN

(71) Applicant: Spliced IP Limited, London (GB)

(72) Inventor: James Lucas, London (GB)

(73) Assignee: Spliced IP Limited

(*) Notice: Subject to any disclaimer, the term of this patent is extended or adjusted under 35 U.S.C. 154(b) by 0 days.

(21) Appl. No.: 16/616,788

(22) PCT Filed: May 23, 2018

(86) PCT No.: PCT/EP2018/063449
§ 371 (c)(1),
(2) Date: Nov. 25, 2019

(87) PCT Pub. No.: WO2018/215512
PCT Pub. Date: Nov. 29, 2018

(65) Prior Publication Data
US 2020/0085197 A1 Mar. 19, 2020

(30) Foreign Application Priority Data
May 25, 2017 (GB) .................................. 1708412

(51) Int. Cl.
*A47C 7/62* (2006.01)
*A47C 17/04* (2006.01)
*A47C 17/86* (2006.01)
*A47C 7/72* (2006.01)

(52) U.S. Cl.
CPC ............... *A47C 7/62* (2013.01); *A47C 7/723* (2018.08); *A47C 7/727* (2018.08); *A47C 17/04* (2013.01); *A47C 17/86* (2013.01)

(58) Field of Classification Search
CPC .......... A47C 7/62; A47C 7/727; A47C 7/723; A47C 17/04; A47C 17/86
USPC ..................................................... 297/217.1
See application file for complete search history.

(56) References Cited

U.S. PATENT DOCUMENTS

| | | | |
|---|---|---|---|
| 2006/0219843 A1* | 10/2006 | Martin ............... | B64D 11/0644 244/118.6 |
| 2010/0193634 A1* | 8/2010 | Hankinson ......... | B64D 11/0605 244/118.6 |
| 2013/0314852 A1* | 11/2013 | Kincaid ................ | F16M 11/04 361/679.01 |
| 2016/0015186 A1 | 1/2016 | Wright | |

FOREIGN PATENT DOCUMENTS

| | | |
|---|---|---|
| DE | 29722327 U1 | 2/1998 |
| DE | 102014115897 A1 | 5/2016 |
| EP | 0825060 A2 | 2/1998 |
| GB | 2481625 A | 1/2012 |

* cited by examiner

*Primary Examiner* — Mark R Wendell
(74) *Attorney, Agent, or Firm* — Invention To Patent Services; Alex Hobson

(57) ABSTRACT

A seat (10) comprises a frame (12), a backrest (14) fixed relative to the frame (12), a movable seat squab (16) and a movable screen (18), the screen (18) being movable between a lowered position and a raised position for providing privacy to a person sitting on the seat (10), in which downward motion of the movable seat squab (16) causes upward motion of the movable screen (18) from the lowered position to the raised position.

19 Claims, 24 Drawing Sheets

SEAT WITH PRIVACY SCREEN

BACKGROUND TO THE INVENTION

It is known to provide "responsive furniture", with moving parts to move the furniture from one configuration when it is out-of-use to another configuration when it is in use. For example, GB2481625 discloses a seat comprising a seat squab and a backrest, in which the backrest rises when a person sits on a seat squab.

'Pods' and various furniture with privacy screening is also known. This if often used for example in open-plan offices to provide spaces for private meetings. However, one problem with these pods is that the very screening that provides privacy also prevents someone from seeing whether the pod is occupied. Those using the pods may therefore still be subject to interruptions from people checking to see whether the pod is available.

It is an object of the invention to provide a wider range of responsive furniture, including furniture which provides privacy when occupied and also provides an indication of when it is occupied.

STATEMENT OF INVENTION

According to the present invention, there is provided a seat comprising a frame, a backrest, a movable seat squab and a movable screen, the screen being movable between an open position and a closed position for providing privacy to a person sitting on the seat, downward motion of the movable seat squab causing motion of the movable screen from the open position to the closed position.

The backrest may be fixed relative to the frame. Alternatively, the backrest may be fixed relative to the seat squab.

Preferably, the open position of the screen is a lowered position, and the closed position is a raised position, so that downward motion of the seat squab causes upward motion of the screen.

The movable screen provides privacy and isolation to the user in the raised position, and minimal visual disruption in the lowered position. When the screen is in the lowered position, the seat is substantially smaller and has a reduced visual profile. This minimises visual clutter in an environment. In the raised position, the screen shields the user from noise and other distraction. It also prevents conversations the user is participating in from being overheard, and hides the user from the view of onlookers from at least one direction. When the seat is not in use, the screen will occupy the lowered position. When a user sits on the movable squab, the weight of his body will cause the squab to move downwards, which will cause the screen to rise. This provides a visual indication to others that the seat is in use, so that a person who wishes to use the seat does not need to disturb the present user of the seat to check its occupancy. The screen therefore has a secondary purpose as an occupancy indicator.

Another advantage of the movable seat squab is that the user is in contact with the squab over a range of motion before the squab and user attain the final sitting position. The seat squab therefore supports the user from a higher position during the act of sitting. This can be helpful to users with compromised lower body strength or who suffer from impaired balance or stability.

The screen may include a central section, a first wing and a second wing. This allows the user to be shielded from view and noise in multiple directions simultaneously. For example, a left wing and a right wing could be provided. The user is thus enclosed on three sides, enhancing the degree of privacy and isolation provided. The left and right wings prevent visual distractions from being visible in the peripheral vision of the user.

At least one guide member may be provided for constraining motion of the seat squab to a linear path. This stabilises the motion of the seat squab. If a user sits on the seat with a degree of sideways motion, the guide member prevents the squab from moving in unintended directions. This minimises potential damage to other parts of the mechanism and provides a smooth and continuous motion of the seat squab, and therefore of the screen.

At least one damper piston may be arranged to resist movement of the seat squab. This smoothes the motion and prevents sudden movement of the screen. When the user leaves the seat, the weight of the screen will cause the seat squab to rise and the screen to lower. The damper piston slows this motion so that the seat squab does not strike the user as he rises, and the fall of the screen does not damage the mechanism through sudden impact.

A counterweight may be provided for partially balancing the weight of the screen. The counterweight applies a force to the screen in substantially the opposite direction to the weight of the screen. In the not-in-use condition, without the counterweight, the net force on the screen due to gravity would be the weight of the screen. With the counterweight, the net force due to gravity is lower. The force that must be applied to the screen to cause it to rise is therefore lower. This allows a user who weighs less than the screen to cause the screen to rise, so that a heavier screen may be provided. This is particularly advantageous when providing a privacy screen, because a larger heavier screen may be provided for both visual and acoustic privacy.

The counterweight may be connected to the bottom of the screen via a pulley. This allows the counterweight and pulley to be concealed within the frame of the seat or the backrest, as the bottom of the screen may be concealed within or between these components even in the raised position.

The counterweight may be connected to the central section of the screen. The centre of mass of the screen is likely to be in the central section. The counterweight is therefore connected here to minimise the distance from the line of action of the counterweight force to the centre of mass of the pulley. This minimises torque applied to the screen during movement.

Counterweights may alternatively or additionally be provided within the frame sides of the seat, attached to parts of the drivetrain which move with the seat squab. As a further option, counterweights could be provided on or under the seat squab itself.

As an alternative to a counterweight, a preload could be provided in another way, for example using gas springs to put an upwards force on the screen (or a downwards force on the seat squab), reducing the extra force which needs to be added to overcome gravity and raise the screen.

A counterweight or a preload can be used to ensure that a large, heavy screen can be moved. The screen can therefore be made large enough to provide visual and acoustic privacy. Also, by reducing the force necessary to move the screen, the gearing ratio can be made large, to move the screen a relatively large distance compared with the displacement of the seat squab, for example, five times the distance.

At least one tensioned cable or cord may be attached to the screen and may be indirectly or directly connected to the seat squab. The tensioned cable connects the squab to the screen so that movement of the squab may cause movement of the screen. An indirect connection between the tensioned cable and the seat squab means any mechanism whereby the tensioned cable is caused to move as a result of movement of the seat squab.

A first tensioned cable may be provided on a first side of the seat and a second tensioned cable may be provided on a second side of the seat. Each cable provides a connection between the squab and the screen, to ensure an even lift side-to-side and to avoid any net torque in the plane of the backrest. In some embodiments a single cable is provided which forms part of the mechanism on both sides of the seat, and passes between the sides, for example underneath the seat squab.

Each tensioned cable preferably runs past or around at least one pully, drum or reel. The relevant pully drum or reel on the first side of the seat may be (directly or indirectly) rotationally coupled to its corresponding pully drum or reel on the second side. In this way, the movement of the tensioned cables on either side is guaranteed to be equal, even when there are uneven forces across the width of the seat squab. This allows a large, long screen to be lifted evenly, for example on a two- or three-seater sofa or bench.

The first tensioned cable may be attached to the first wing of the screen, and the second tensioned cable may be attached to the second wing of the screen. Alternatively, a single cable may be attached to the first wing of the screen at one end and the second wing of the screen at the other end.

Each tensioned cable or each end may be attached to a front part of a wing of the screen, and also to a rear part of that wing. This provides an even lift and also ensures that any torques applied to the screen in the plane of the wings are balanced.

It will be appreciated that where a cord or cable is attached to another component at a point along its length, it is not important whether there is a single cable which is fixed to the component and which extends away from the component in both directions, or whether there are two cables, each of which is attached to the component at its end, and the two cables extending away from the component in different directions. One option might be preferred for assembly, maintenance and repair, but it makes no difference in operation.

A respective displacement multiplier may be provided in the drivetrain between the seat squab and the screen, the displacement multiplier causing greater movement of the movable screen than movement of the seat squab. A one-to-one relationship between the displacement of the seat squab and the displacement of the screen is not desirable because this would require a large movement of the seat squab to produce enough movement of the screen to significantly shield the user. Large movement of the seat squab is undesirable as this increases the distance between the sitting position of the seat squab and the raised position of the seat squab, meaning that either the sitting position must be uncomfortably low for the user or the seat squab must be unusually high when not in use, this latter condition presenting difficulties to users of small stature.

The connection between the seat squab and the tensioned cable may comprise a belt or chain, and a reel. The belt or chain may be connected to the seat squab, or a part that moves with the seat squab, so that the seat squab causes linear movement of the belt or chain. Preferably the belt or chain may form an endless loop, so that linear movement of the part of the belt which is connected to the seat squab in one direction (e.g. downwards) causes movement of the chain as a whole in, for example, an anticlockwise direction. Likewise, linear movement of the seat squab, and so the part of the belt connected to the seat squab, in the other (e.g. upwards) direction would cause movement of the belt as a whole in the other (e.g. clockwise) direction. The belt or chain may pass around sprockets or jockey wheels, to ensure it follows a well defined path. In some embodiments, a belt may be tensioned slightly around the sprockets or wheels.

The reel may be provided at some point in contact with or connected to the moving belt or chain, so that movement of the belt or chain causes rotation of the reel. In this way, linear movement of the seat squab causes rotational movement of the reel, which in turn controls motion of the tensioned cable.

The displacement multiplier may conveniently be provided as part of the connection between the belt and the reel. For example, a large diameter reel may be rotationally coupled to a small diameter sprocket. The belt or chain drives the small diameter sprocket, which in turn drives the large diameter reel. This results in a larger linear motion of the tensioned cable (and therefore the screen) than the linear motion of the belt (and therefore the seat squab).

Preferably, the displacement multiplier is adapted to cause the screen to move about five times the distance of the squab. This would mean providing a reel with five times the diameter of the corresponding sprocket.

The tensioned cable may be attached to the reel such that, on rotation of the reel, cable is paid out in one direction and taken in in the other direction. This may be achieved for example simply by wrapping the tensioned cable one or more times around the reel, without a break in the cable. The tensioned cable may be in a continuous loop. Alternatively, there may be a break in the cable at the reel, or there may be two or more cables, each fixed to the reel at its end.

Even where there is no break in the cable, it may be preferable to fix the cable to the reel in some way, to ensure that the cable does not slip on the reel.

The tensioned cable and reel may be arranged so that when the wheel rotates, cable may be demanded in one direction and paid out in the other. This maintains tension in the cable. If the reel rotates in one direction, cable is paid out in that direction and an equal amount of cable will be taken in at the other end of the cable to compensate for this, so the cable will remain in tension.

The reel on one side may be rotationally coupled to the reel on the other side, to ensure that the tensioned cables on either side move exactly together. Preferably, this is done by coupling together sprockets on opposing sides around which the belts or chains run. Ideally, a sprocket or jockey wheel is provided at a low point on either side, so that they can be coupled together by a shaft which runs underneath the seat squab.

As an alternative, the tensioned cable may be connected to the seat squab, or a part which moves linearly with the seat squab, at one end, and to the screen or a part that moves linearly with the screen at the other end. This is a more direct connection between the seat squab and the screen, without needing sprockets, belts, reels etc.

The tensioned cable may pass through a system of pullies in order to convert downward movement of the seat squab at one end of the cable into upward movement of the screen at the other end of the cable. Preferably, a pully block is provided which moves with the seat squab and another pully block is provided which is fixed to the frame. The cable may run from one end, fixed to the seat squab (or a part which moves with the seat squab), around the pully block which is fixed to the frame, then around the pully block which moves with the seat squab, then back around the pully block which is fixed to the frame. In this way, a small motion of the seat squab translates into a large motion at the other end of the cable, which in turn can cause a large motion of the screen. In some embodiments, the cable passes between the pully block moving with the seat squab and the pully block fixed to the frame multiple times, for example to cause the screen to move five times further than the seat squab.

Preferably the cable is anchored to the seat squab substantially at a central point, underneath the seat squab. There may be two cables and two pully arrangements, one on either side of the seat. The ends of the two cables may each be anchored to the seat squab at the central anchor. Alternatively, there may be a single cable which instead of being anchored to the seat squab, runs under the seat squab between the two sides, then through the pully system on either side with the ends anchored to the screen, or a bracket or other part which is in turn connected to the screen. The centre of the cable is then free to move left or right, i.e. towards one or the other side of the seat. Where the centre of the cable is free to move, and in fact there is a single continuous cable, the tension in the cable and therefore the forces on the pullies at either side will always be uniform. However, the screen may not move completely horizontally, if force is applied to the seat more on one side than the other (as would be the case if a single person sat down on one side of a two-seat sofa). On the other hand, anchoring the cable (or the ends of two cables) to the seat squab fixes the length of the cable between the centre and either end, forcing horizontally level movement of the screen, but at the expense of potentially imbalanced forces on the pully mechanisms on either side, which have the potential to cause the mechanism to jam. A good compromise has been found which involves allowing the centre of the cable to move between two limits, so that imbalanced forces can be corrected to some extent, whilst retaining more or less horizontally level movement of the screen. This can be achieved by fixing the ends of the two cables to a block (or indeed by fixing the centre of a single continuous cable to a block), and providing stops with apertures through which the cable can freely run, but which are not large enough to allow passage of the block. Preferably, springs can be provided between the block and the stops on either side, to bias the block back into a central position when all forces are removed from the seat.

First and second levelling cables may extend between first and second sides of the frame and pass through at least two pairs of rollers on the seat squab. This maintains even movement of the squab and screen.

The first levelling cable may be attached to an upper part of the first side of the frame and a lower part of the second side of the frame and the second levelling cable may be attached to a lower part of the first side of the frame and an upper part of the second side of the frame. The levelling cables thus form an 'X' shape. The seat squab is disposed above the point at which the cables cross. This configuration means that a downward movement of the first side of the seat squab will demand cable from the first levelling cable, and this demand is met on the second side by pulling the squab down at the second side, and vice versa.

The first levelling cable may pass under a roller on a first side of the seat squab and over a roller on a second side of the seat squab and the second levelling cable may pass under a roller on the second side of the seat squab and over a roller on the first side of the seat squab. In this configuration, when the first side of the squab moves down, cable is demanded at the upper roller on the first side of the squab, which demands cable on the second side of the squab, which applies a downwards force to the lower roller on the second side, and vice versa when the second side of the squab moves down.

An alternative way of levelling the screen uses linked hydraulic cylinders on either side. The hydraulic cylinders may be connected to either of the moving parts, i.e. to level the screen or to level the squab, or both. On each side, a first hydraulic cylinder may be arranged so that it is extended as the moving part moves upwards, and a second hydraulic cylinder may be arranged so that it is contracted as the moving part moves upwards. All the cylinders are fixed to the frame and to the moving part (the squab or the screen) so that the cylinders will move the squab or screen, and movement of the squab or screen will operate the cylinders. The extending cylinder on one side may be connected via a hose to the contracting cylinder on the other side, and vice versa.

In this way, the two lateral sides of the seat squab or screen are forced to move together, so that the squab or screen remains horizontal throughout its motion. Because the seat squab and screen are preferably linked by drivetrains on each side, levelling the squab should be sufficient to level the screen. However, if there is some play in the drivetrains, as in some embodiments, then preferably the squab should be leveled as a priority. It is however possible that in some embodiments a similar hydraulic or other levelling mechanism could be provided on both the squab and the screen.

The screen may rise by pivoting. This minimises the number of points of attachment required between the screen and the frame, and provides an aesthetically stimulating effect.

The movable seat squab may be linked to the movable screen by a hydraulic link. This allows force to be transmitted from the squab to the screen with minimal mechanical complexity, allowing the seat to occupy a smaller volume and reducing design constraints and component wear.

At least one actuator piston having a first end and a second end may be connected to the frame at the first end and to the movable screen (or a part which moves with the movable screen) at the second end. The actuator piston causes the screen to pivot by pushing on the screen and the frame when it extends and pulling on them when it contracts.

A hydraulic cylinder may be provided and may be arranged to be compressed when the movable seat squab moves downwardly, the hydraulic cylinder being connected hydraulically to the or each actuator piston. A weight applied to the squab may thus be converted to pressure in a hydraulic fluid by the hydraulic cylinder. This pressure may be transmitted to the actuator pistons by a hydraulic hose, and converted into movement of the screens by the pistons. The hydraulic hose may be flexible.

The second end of the at least one actuator piston may be connected to the screen via a cam. The piston is connected to the cam at a point spaced from the axis about which the screen is to pivot, so that the linear force exerted by the piston produces a torque on the cam. The cam may be rotationally coupled to the screen about the pivot, so that the pistons and cams may be entirely concealed, improving the appearance, durability and safety of the device.

There may be two actuator pistons: a first actuator piston connected to a first side of the frame and to the first wing of the screen, and a second actuator piston connected to a second side of the frame and to the second wing of the screen. This provides an even lift and minimises stresses placed on the mechanism and frame by unnecessary torques.

The drivetrain between the moving seat squab and the moving screen may include a non-linear torque converter. In other words, a (hypothetically) even force on the input side of the drivetrain would cause a variable torque to pivot the screen on the output side of the drivetrain. In fact, the force on both sides will be non-constant through the travel of the drivetrain, but the torque converter ensures that a greater torque is applied to the screen when it is at a position where the centre of mass is further horizontally from the pivot, and therefore a greater moment is required to move the screen. This may be achieved by an elliptic sprocket rotationally coupled to a circular sprocket, the two sprockets being connected respectively to the squab side of the drivetrain and the screen side of the drivetrain.

In some embodiments, a power assist mechanism may be provided. The power assist may include an electric motor, coupled to some part of the drive train between the seat squab and the screen. For example, where a chain or belt is provided around sprockets, to transfer motion from the seat squab to a reel, the electric motor may be rotationally coupled to one of the sprockets, so that the motor may drive the chain and vice versa.

An occupancy detector, for example a pressure pad, break-beam detector or similar may be provided for detecting when a person is sat on the seat, and operating the power assist mechanism.

Providing an electrical power assist allows for heavier screens to be used, which can still be raised in response to a single, potentially small person, sitting on the seat. This is particularly useful in making large responsive furniture, for example multi-person pods, benches or sofas, which will still work in response to just one person sitting down. Also, a larger gearing ratio can be provided, allowing a heavy screen to be moved further, for example five times as far as the movement in the seat squab. This is particularly advantageous for a privacy screen, since greater movement of the screen will result in more privacy.

An electrical power assist may also allow multiple similar seats to be linked, for example mechanically or hydraulically. The mechanisms of the seats could be coupled together, for example by mechanically coupling the movable screens of two seats next to each other. In principle, downward movement of one of the seat squabs could then cause upward movement of all the screens in the group of coupled-together seats. However, power assistance will be required for a single person to be able to cause movement of multiple heavy screens.

In some embodiments, the motor is coupled to the drive train in such a way that motion of the drive train caused by a downward force on the seat squab will cause rotation of the motor. In this way, a control unit may monitor the voltage across the output terminals of the motor, and detect when this rises above a threshold, indicating that the motor is being turned by a force on the seat squab causing motion in the drivetrain. In other words, the motor acts as a generator and the electricity generated can be detected. In response to an initial movement and therefore a voltage across the motor, the control unit may switch on an electrical power source to drive the motor, moving the drivetrain, the seat squab and the screen.

Where multiple seats are coupled together, the motors may be indexed together by shaft encoders or similar to ensure that all the screens move together.

In some embodiments, the screen in the closed position may extend in front of the seat. A display screen or projection may be provided on an inner surface of the screen, so that when the screen is closed, a person sat on the seat can (for example) watch a movie or take part in a video conference. For this purpose, cameras, microphones and speakers may also be provided.

In some embodiments, the screen may be articulated, and may be configured to contract in the open position and expand in the closed position. This allows for a large screen, potentially extending in front of the seat as well as around the back and sides in the closed position, for a large degree of privacy, but a seat which is not substantially obscured when the screen is in the open position, because the contracted screen may not extend further than the extent of the static seat frame back and sides.

According to a second aspect of the present invention, there is provided a seat having a seat squab and a backrest or screen, the backrest or screen being movable between a lowered position and a raised position, an electric motor being provided for moving the screen between the lowered position and the raised position, an occupancy detector on the seat causing activation of the electric motor to move the backrest or screen from the lowered position to the raised position in response to a person sitting on the seat squab, and optionally communication means being provided for connection with at least one other similar seat, the communication means being arranged to transmit a signal to the other seat(s) when occupancy is detected, and being arranged to receive a signal from other seat(s) and causing activation of the electric motor to move the backrest or screen from the lowered position to the raised position, when a signal is received.

It is envisaged that multiple seats may be arranged facing each other, in a circle, semi-circle, etc. The communication means may be wireless, so the seats do not need to be physically connected. When a person sits down on a single seat in the arrangement, pressure on the seat squab will cause the backrest or screen to rise on that seat. At the same time, a signal will be transmitted on the communication means to all the other seats in the arrangement. The signal will be received and will cause the backrest or screen of each other (unoccupied) seat in the same set to rise. This allows multiple pieces of responsive furniture to work together in flexible arrangements, to build private meeting areas which are screened off when in use, as soon as a single person has sat down. It is envisaged that the communication means may have multiple channels or codes, so that seats can be easily reconfigured into different groups as required.

The communication means may be wired or wireless. The electric motors may be mains- or battery-powered, or have any other suitable power source.

The communication means may be configured to link with a central server, which receives information from multiple seats as to occupancy. The central server may receive information from multiple groups of seats, i.e. seats may all be connected to the same server, but only those on the same "channel" will directly cause each other's screens to open and close. The central server can record which seats were used, when and for how long. This information may be used to map use patterns to inform more intelligent space design.

The seat squab may optionally be movable, and movement of the seat squab may cause movement of the screen or backrest in a similar way to embodiments of the first aspect of the invention, with a power assist. Alternatively, the seat squab may be fixed but just contain a detector, for example a pressure pad, to determine when someone is sat down and thus activate the electric motor and the communication means.

BRIEF DESCRIPTION OF THE DRAWINGS

For a better understanding of the present invention, and to show more clearly how it may be carried into effect, reference will now be made by way of example only to the accompanying drawings, in which.

DESCRIPTION OF PREFERRED EMBODIMENTS

Figure 1:
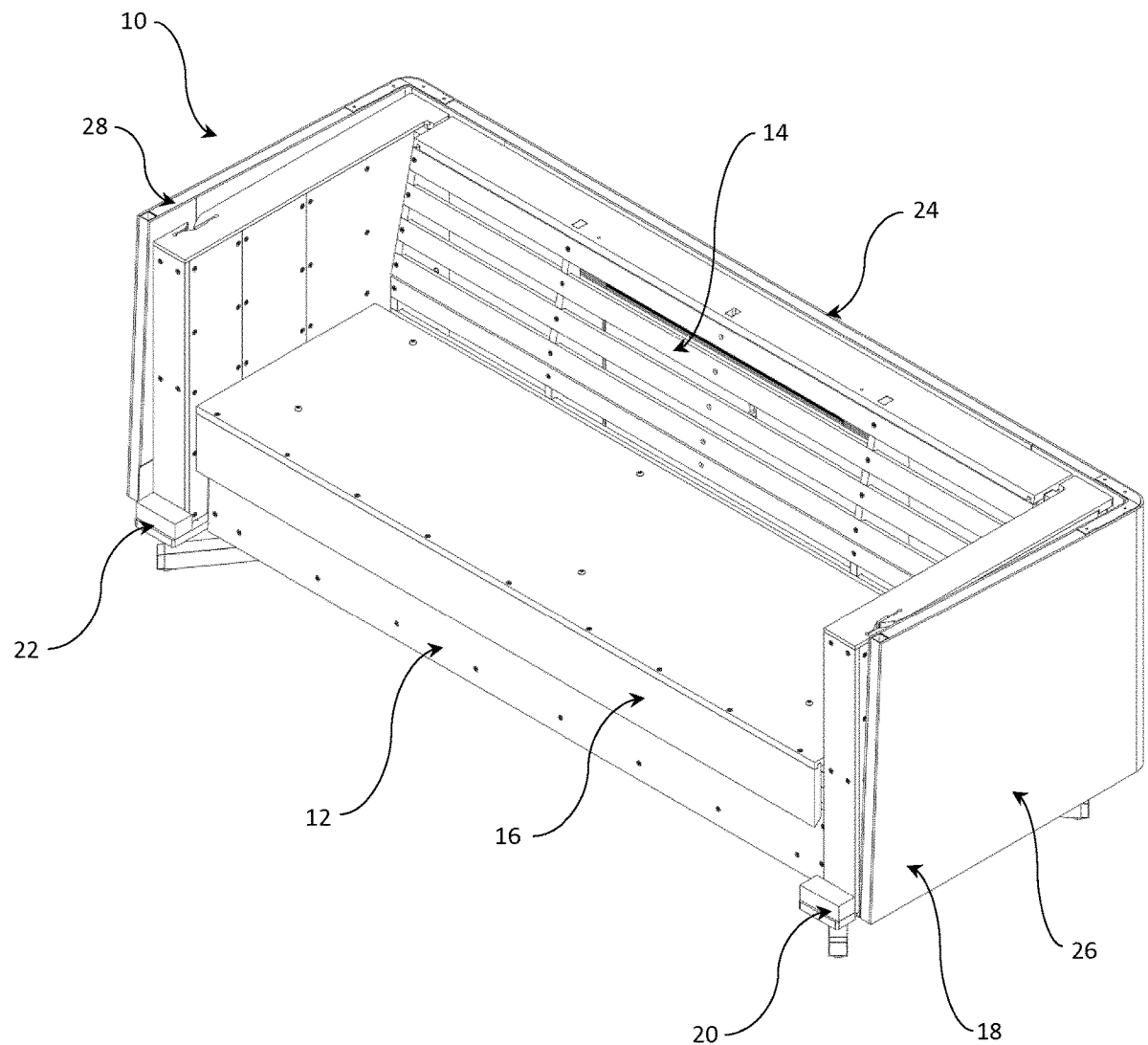
FIG. 1 shows an isometric view of a seat with a privacy screen in the lowered position from the front.

Referring firstly to FIG. 1, a first embodiment of a seat with a movable privacy screen is indicated generally at 10. The seat comprises a frame 12, a backrest 14, a movable seat squab 16 and a movable screen 18.

The seat also has left and right frame sides 20 and 22. The sides 20, 22 form part of the fixed frame 12, which includes the backrest 14 and the two sides 20,22. The tops of the sides provide arms. Left and right are defined from the point of view of a person sitting on the seat with his back to the backrest 14. The backrest 14 is fixed relative to the rest of the frame 12.

The screen 18 comprises a central portion 24, a left wing 26 and a right wing 28. The central portion 24 is parallel to the backrest 14, and is behind the backrest 14. The left wing 26 and right wing 28 are parallel. The left wing 26 is disposed to the left of the left frame side 20. The right wing 28 is disposed on the right side of the right frame side 22. Each wing 26, 28 is a substantially rectangular planar member. The left wing 26 is joined to a left edge of the central portion 24. The right wing member 28 is joined to a right edge of the central portion 24. The joins are substantially at right angles.

The screen 18 thus forms a C shape which surrounds the frame 12 and backrest 14.

Some other embodiments have screens of different shapes. For example, a screen can be provided which is in the form of a continuous curve around the backrest and frame sides of the seat. Likewise the shape of the frame may be curved.

Figure 2:
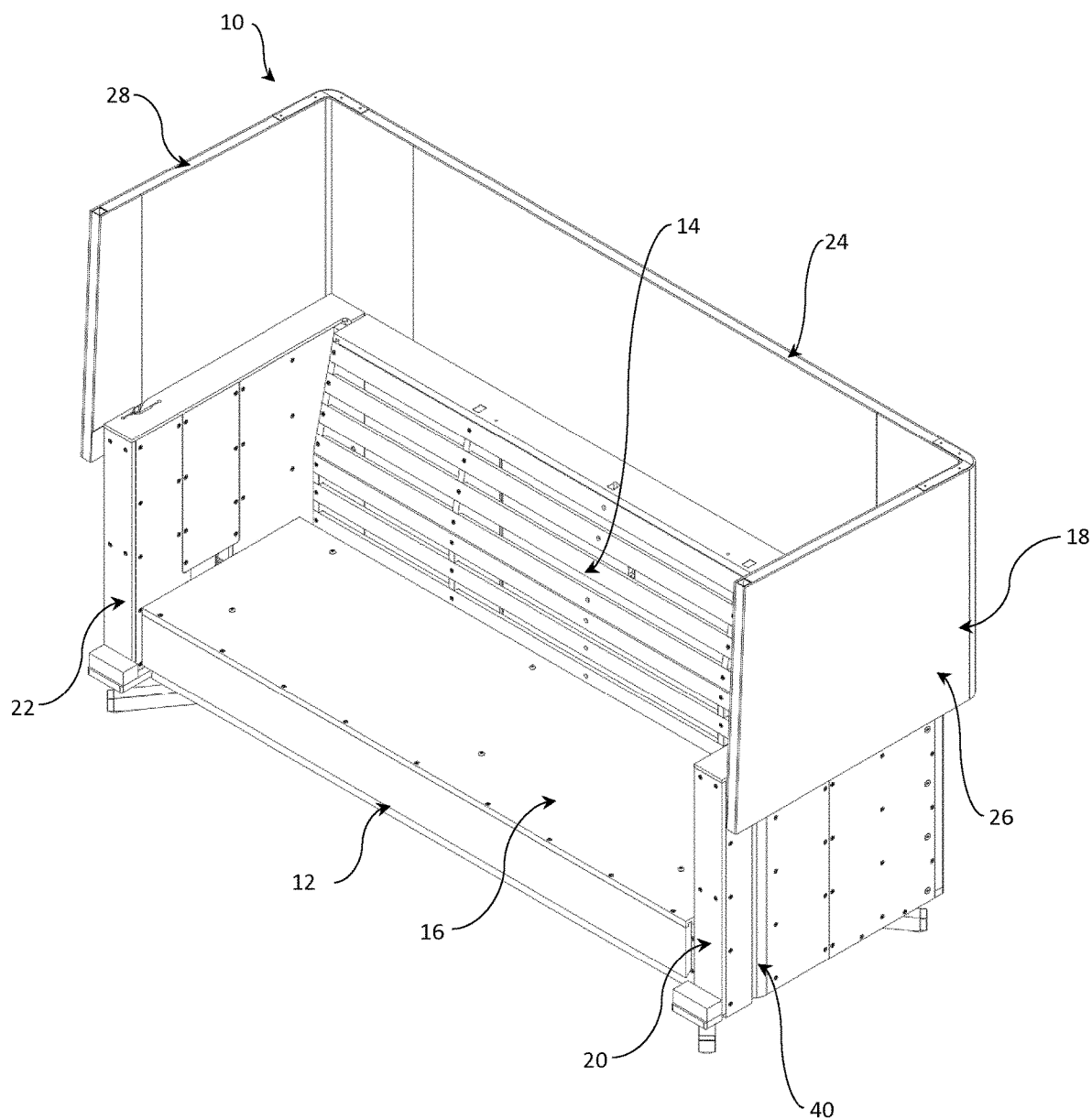
FIG. 2 shows an isometric view of the seat of FIG. 1 with the privacy screen in the raised position.

The screen 18 has a lowered position, shown in FIG. 1, and a raised position, shown in FIG. 2. In the lowered position, the top of the screen 18 is close to and substantially level with the top of the arms 20, 22 and backrest 14. In the raised position, the bottom of the screen 18 is close to, but overlaps, the top of the arms 20, 22 and backrest 14. The raised position of the screen 18 is directly vertically above the lowered position of the screen 18. In other embodiments, there may be different lowered and raised positions. For example, the screen could start well above the level of the top of the frame in the lowered position and rise even higher in the raised position.

Figure 3:
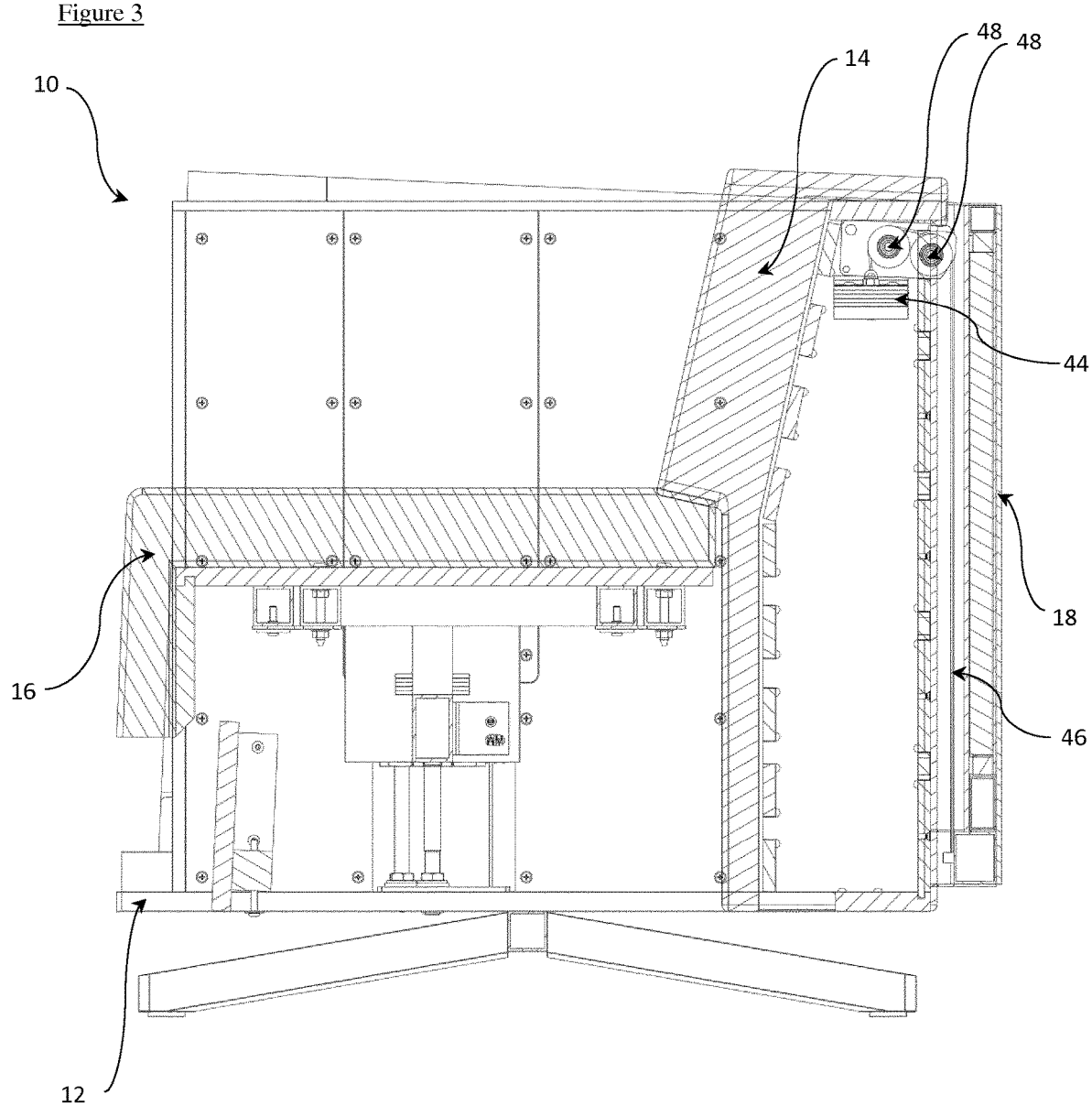
FIG. 3 shows a cross-sectional side view of the seat of FIG. 1 from the left side with the privacy screen in the lowered position.

Referring now to FIG. 3, a cross sectional view of the seat 10 is shown. The cross section is taken in a plane perpendicular to the central portion (24) of the screen 18 at a point substantially at the centre of the seat 10. The screen 18 is in the lowered position.

A counterweight 44 is disposed within the backrest 14 of the seat 10. The counterweight 44 is a bar of metal (but could be made from other materials, for example concrete). The counterweight 44 is attached to a pulley cord 46 which passes over a pair of rollers 48. The rollers 48 are situated within the backrest 14 and near the top of the backrest 14. The pulley cord 46 is connected to the bottom of the central portion 24 of the screen 18. The pulley cord 46 allows the weight of the counterweight 44 to act on the screen 18 in an opposite direction to the weight of the screen 18. This reduces the additional force that must be applied to the screen 18 against gravity to cause it to rise.

Figure 4:
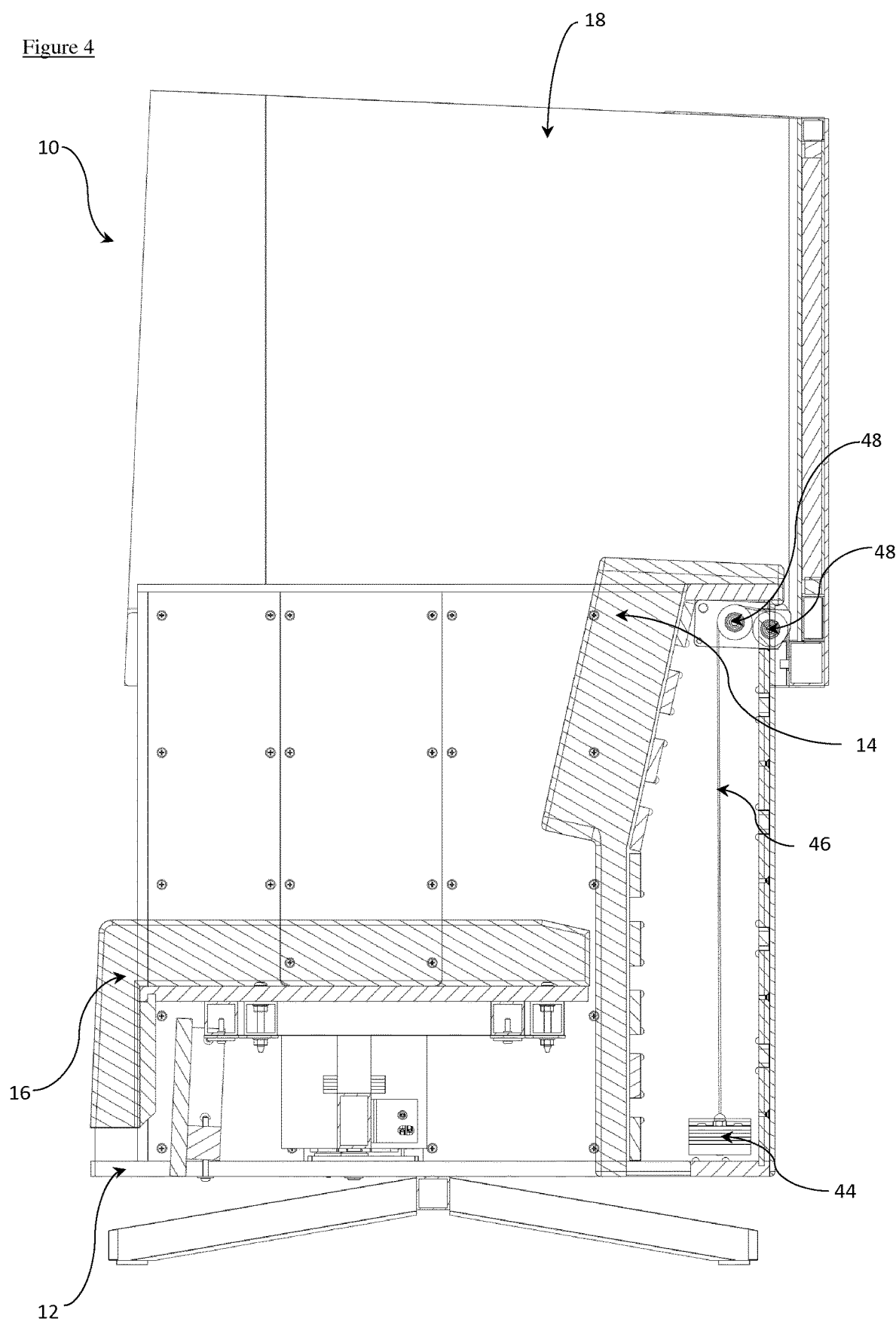
FIG. 4 shows a cross-sectional side view of the seat of FIG. 1 from the left side with the privacy screen in the raised position.

Referring now to FIG. 4, the same cross-sectional view as FIG. 3 is shown with the screen 18 in the raised position. The counterweight 44 has moved vertically downwards within the backrest 14.

Figure 5:
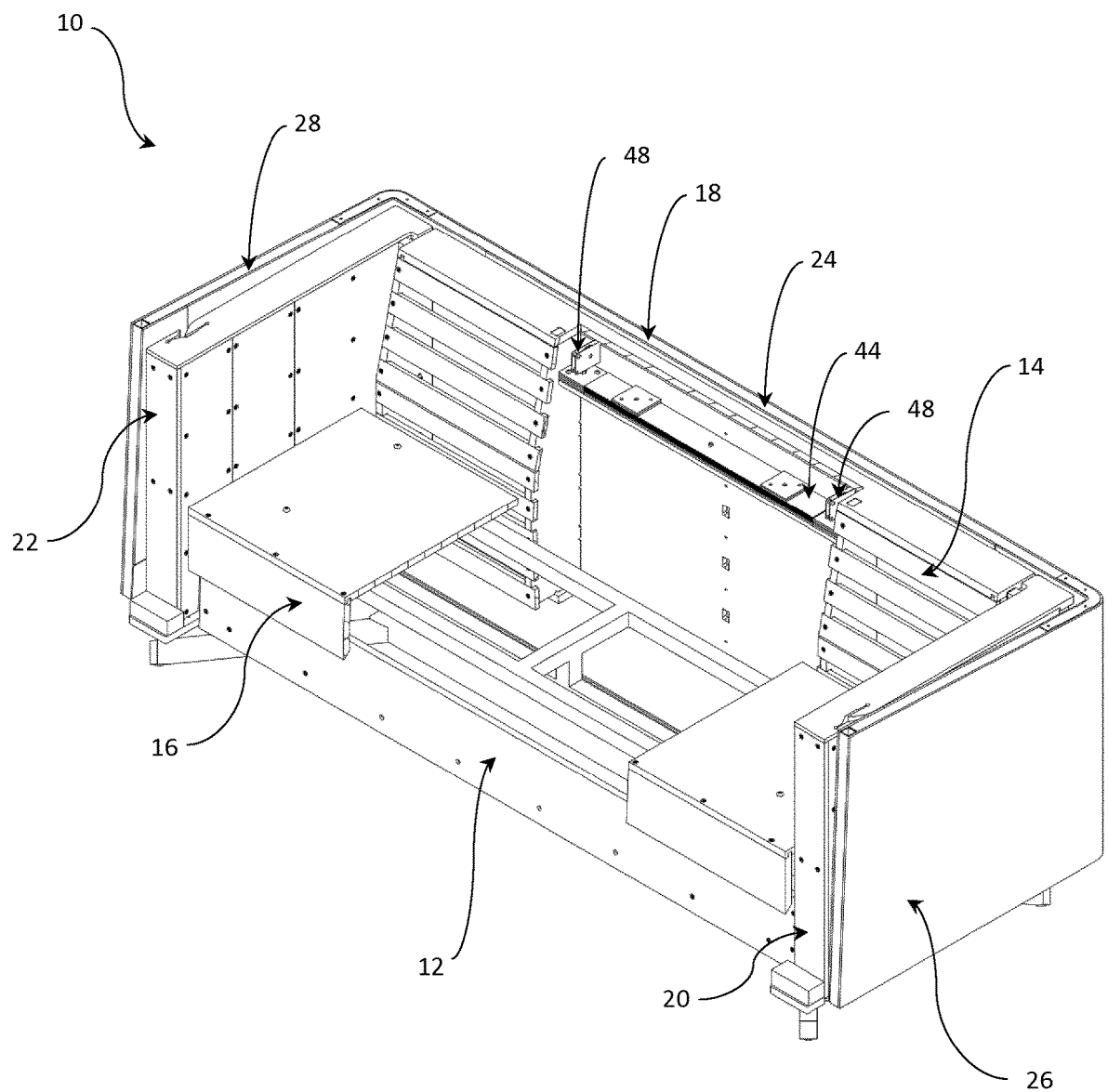
FIG. 5 shows an isometric view of the seat of FIG. 1, with a portion of the squab and backrest cut away with the privacy screen in the lowered position.

Referring now to FIG. 5, the seat 10 is shown in perspective view with a portion of the backrest 14 cut away. The counterweight 44 is shown with the screen 18 in the lowered position and the counterweight 44 is raised. Two pulley cords (46) and two pairs of rollers 48 are present.

Figure 6:
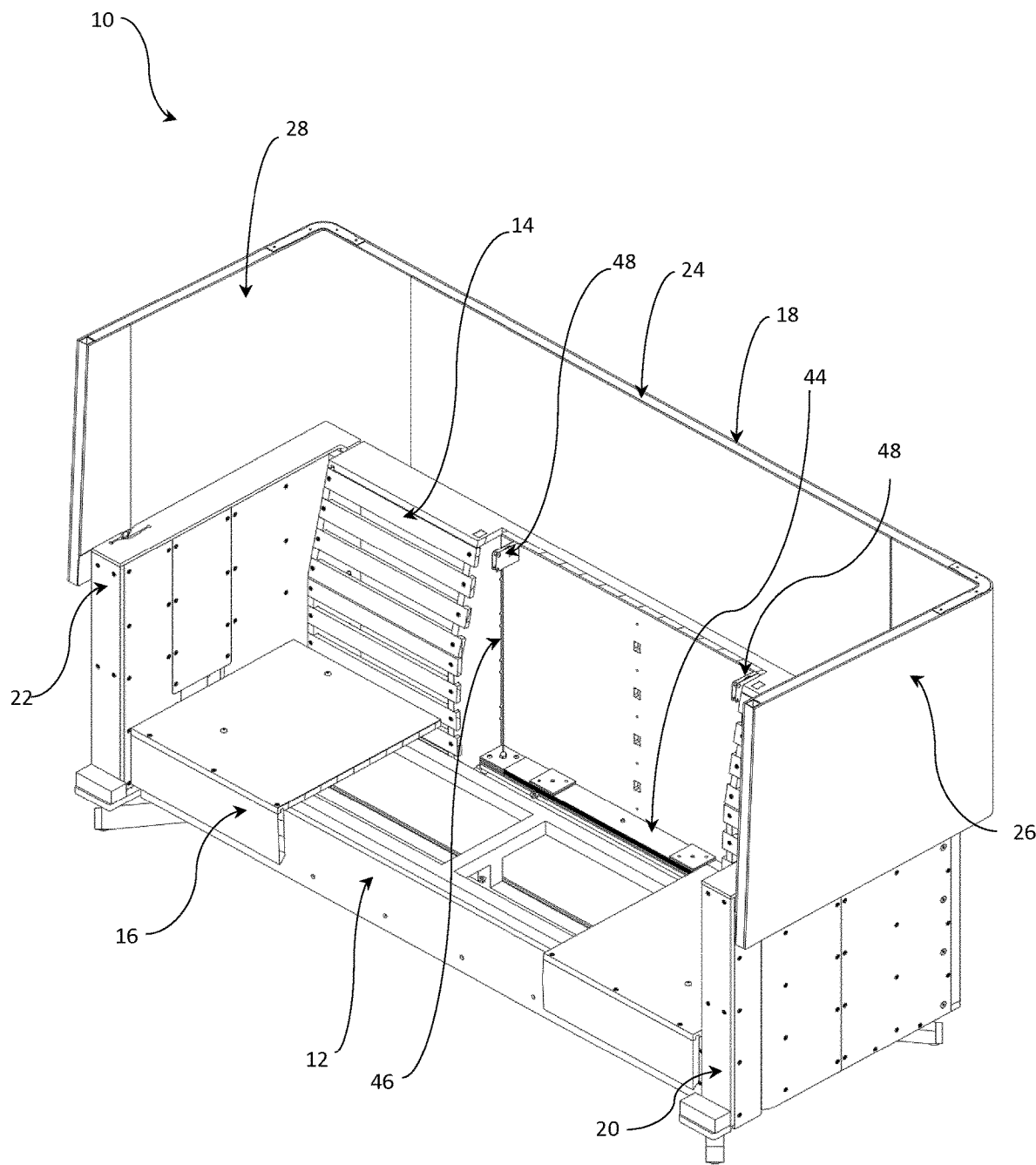
FIG. 6 shows an isometric view of the seat of FIG. 1, with a portion of the squab and backrest cut away with the privacy screen in the raised position.

Referring now to FIG. 6, the seat 10 is shown in perspective view with a portion of the backrest 14 and seat squab 16 cut away. The counterweight 44 is shown lowered, with the screen 18 in the raised position.

Figure 7:
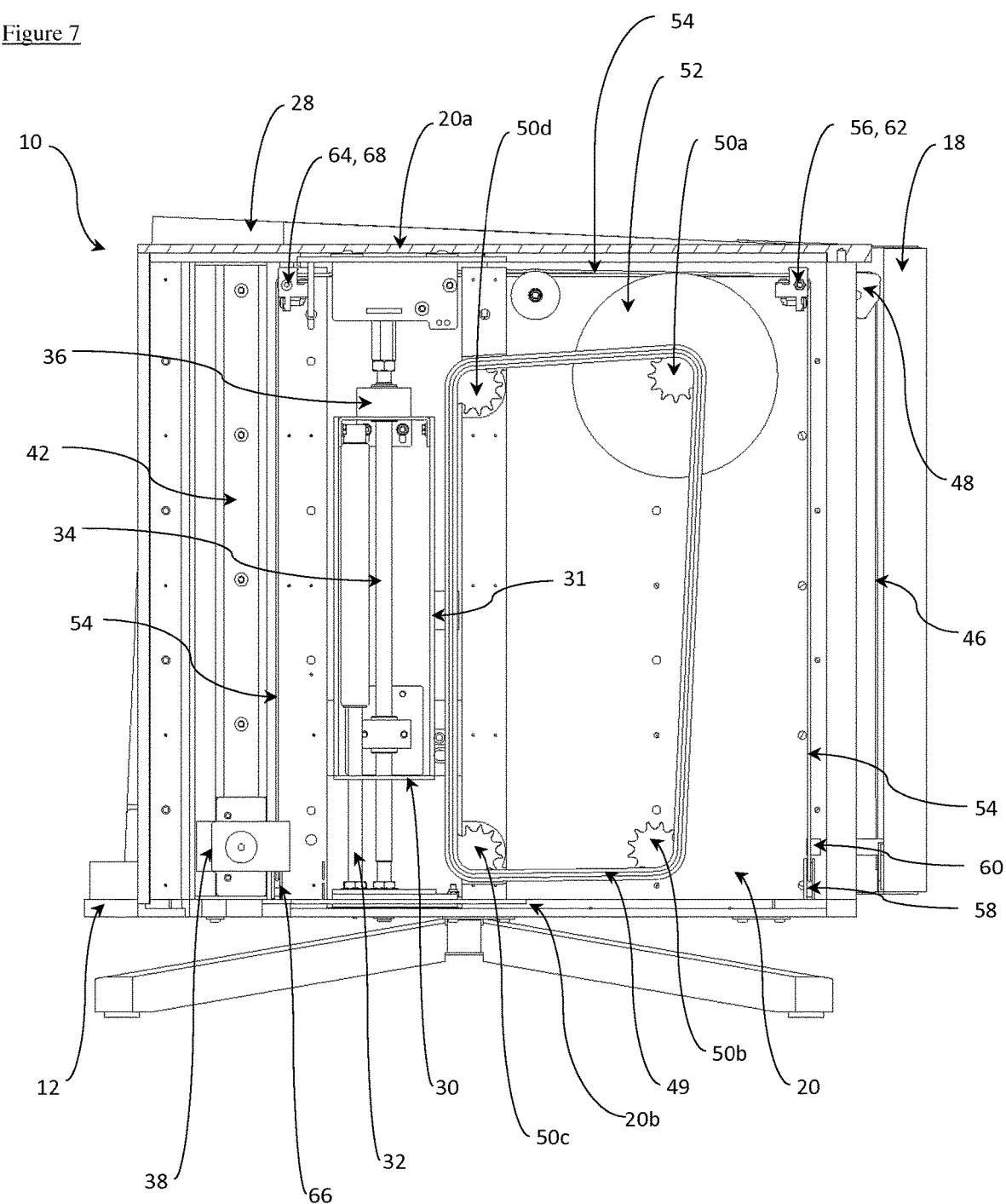
FIG. 7 shows a side view of the seat of FIG. 1 from the left side with the left wing of the screen removed with the privacy screen in the lowered position.
Figure 8:
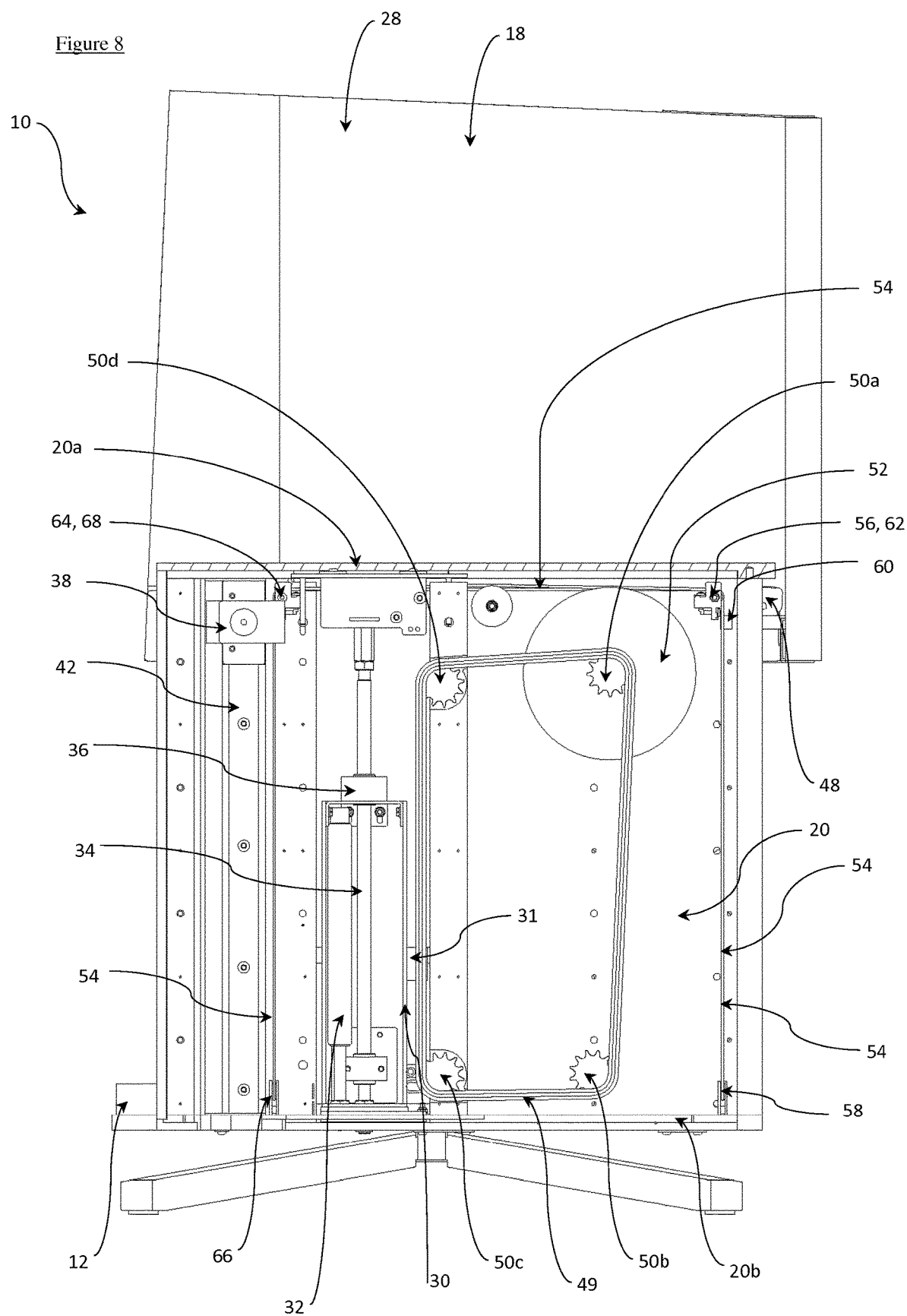
FIG. 8 shows a side view of the seat of FIG. 1 from the left side with the left wing of the screen removed and the privacy screen in the raised position.

Referring now to FIGS. 7 and 8, the mechanism or drivetrain between the seat squab and the screen will now be described. The drivetrain is primarily concealed in the sides 20, 22 of the frame 12. The right frame side 22 is the minor image of the left frame side 20. It is the left side 20 which is shown in FIGS. 7 and 8. The left wing 26 of the screen 18 has been cut away in the figures. The frame side 20 includes an upper wall 20a and a lower wall 20b. The squab (16) is attached to a seat slider 30. The seat slider 30 includes an upper wall and a lower wall, which are connected by a pair of side walls. The upper wall and the lower wall are each apertured to receive the guide member 34. The lower wall is apertured to receive a damper piston 32. This arrangement forms a rectangular box. Open ends of the box face in a direction normal to the wing 26.

Note that as an alternative to, or in addition to the counterweight (44) behind the backrest (14), counterweights could be provided on the seat slider 30.

A damper piston 32 is included in the frame side 20. The top end of the damper piston 32 is attached to the seat slider 30. The damper piston is attached to the upper wall of the slider. The damper piston 32 passes through an aperture (not shown) in the lower wall of the slider. The damper piston 32 is attached to the lower wall 20b of the frame side 20.

A guide member 34 is provided in the frame side 20. The guide member 34 is a rigid elongate member extending vertically from a top part of the frame side 20 to a bottom part of the frame side 20. The guide member is a bar of circular cross section. The seat slider 30 includes a guide member receiving element 36. The guide member receiving element 36 is a block with an aperture shaped to correspond with the guide member 34. The aperture is circular to conform to the circular cross-section of the guide member 34. In motion, the guide member receiving element 36 slides on the guide member 34. The guide member 34 is attached to the upper wall 20a of the frame side 20, and also to the lower wall 20b of the frame side 20.

The frame side 20 includes a screen slider 38. The screen slider 38 has the form of a sheet of material bent into a Z shape, i.e. having a diagonal and two planar parallel sections. A diagonal of the screen slider 38 passes through a slot 40 (see FIG. 2) in the frame side 20. One parallel section of the screen slider 38 is fixed to a bottom part of the left wing 26. The other parallel section of the screen slider 38 is movably attached to a rail 42 in the frame side 20.

Figure 10:
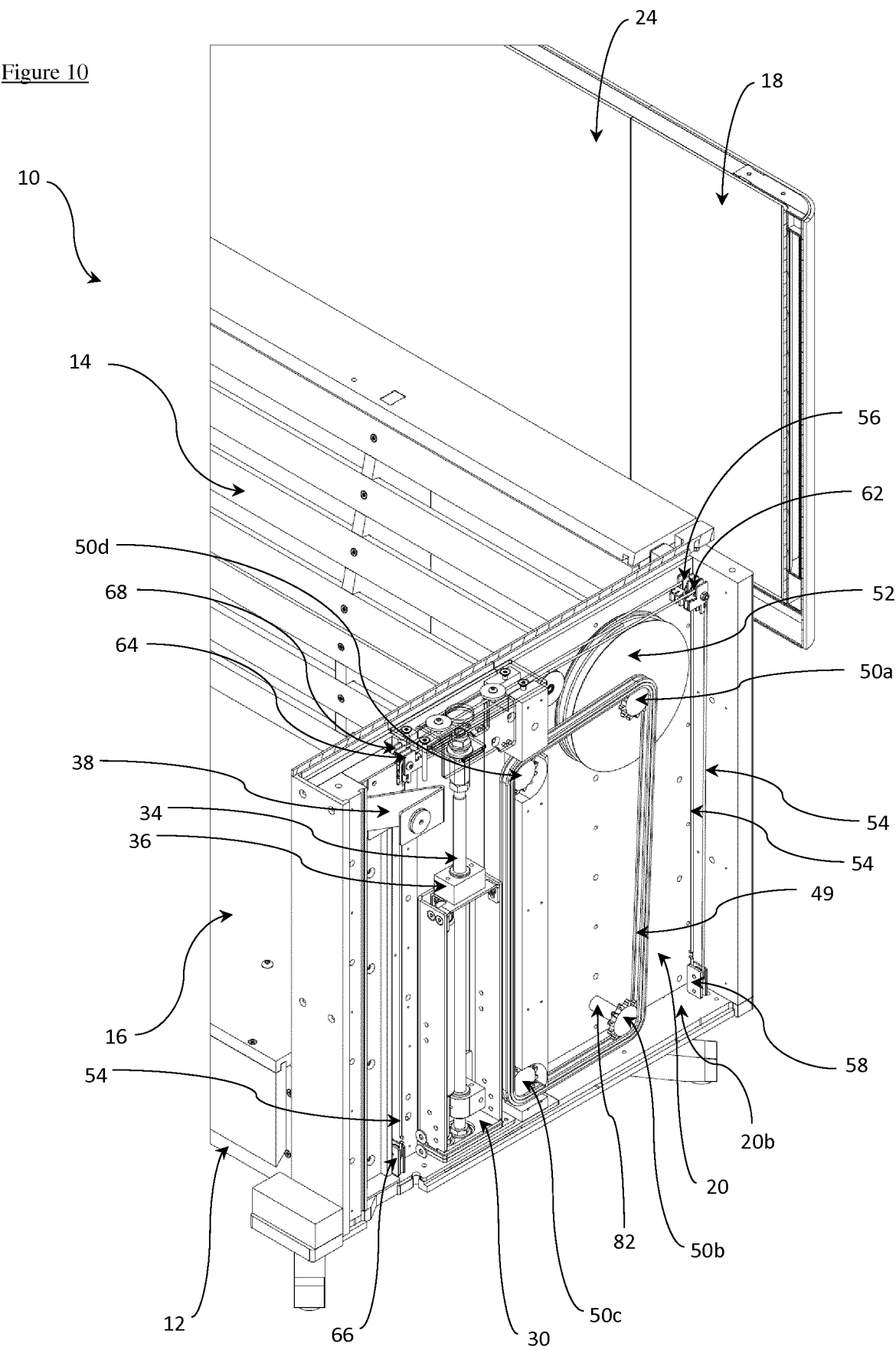
FIG. 10 shows an isometric view of the seat of FIG. 1 from the left side with the left wing of the screen removed and the privacy screen in the raised position.
Figure 11:
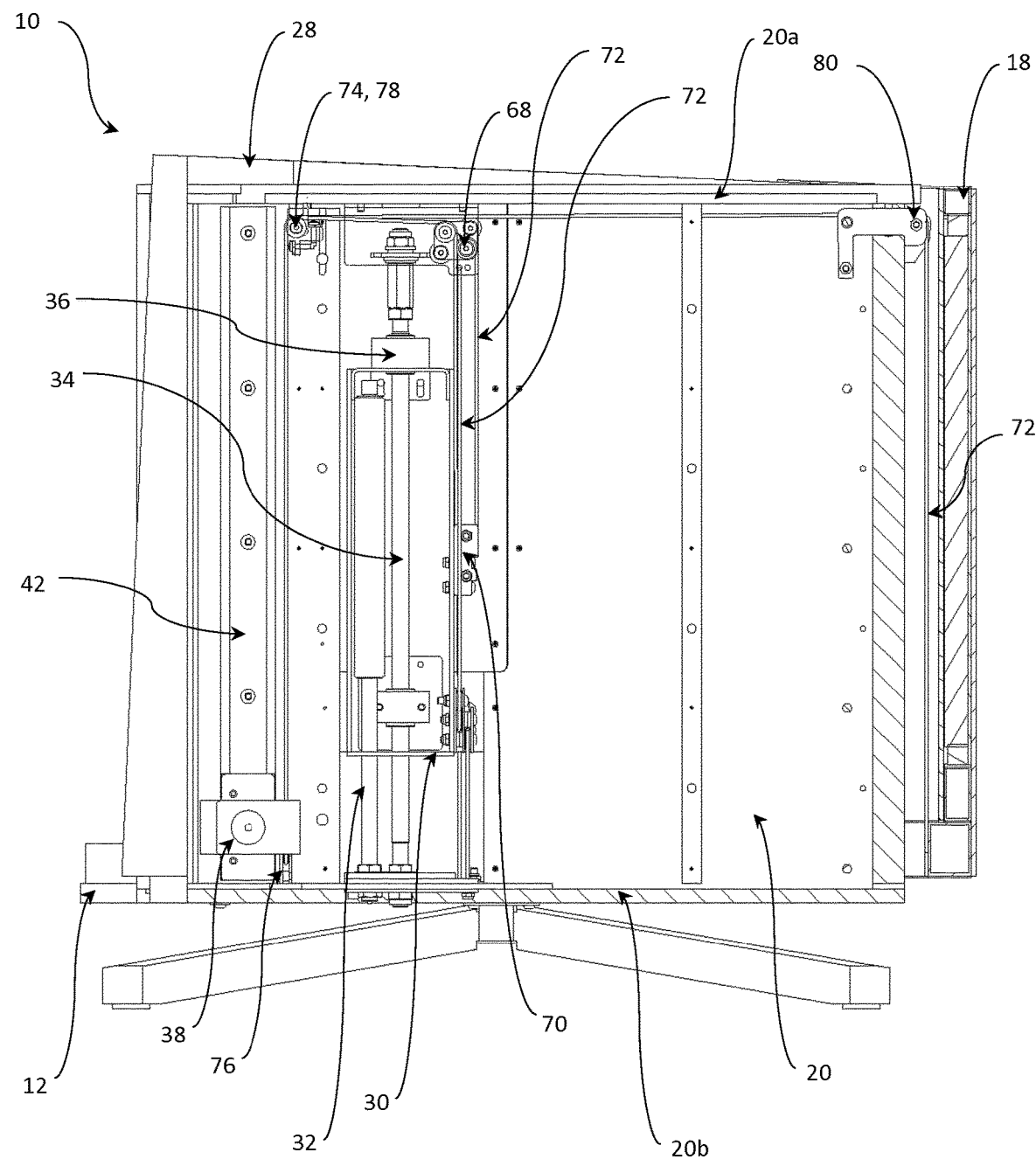
FIG. 11 shows a side view of a second embodiment of a seat with a privacy screen from the left side with the left wing of the screen removed and the privacy screen in the lowered position.
Figure 12:
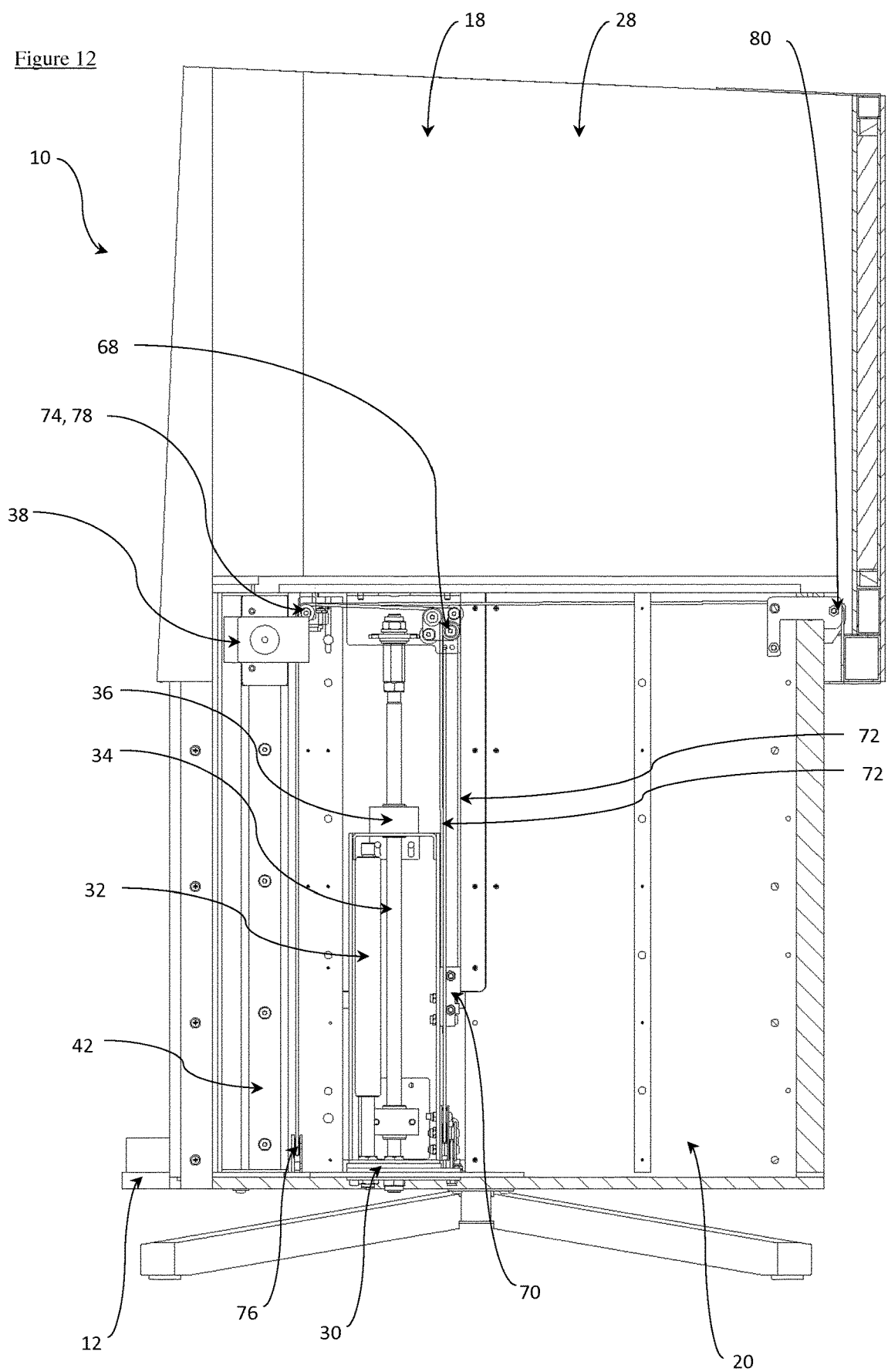
FIG. 12 shows a side view of the seat of FIG. 11 from the left side with the left wing of the screen removed and the privacy screen in the raised position.
Figure 13:
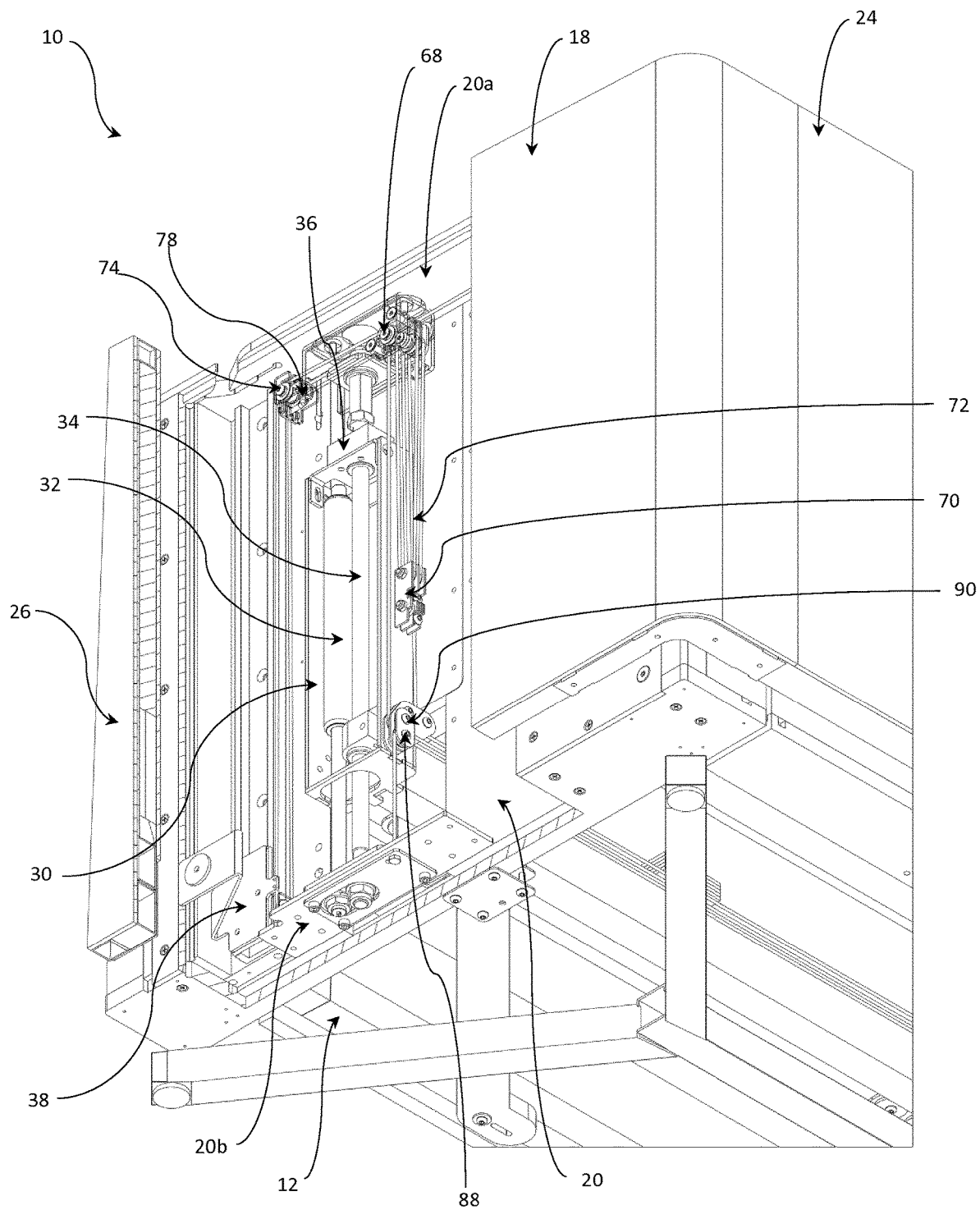
FIG. 13 shows an isometric view of the seat of FIG. 11 from the left side with the left wing of the screen removed and the privacy screen in the lowered position.
Figure 14:
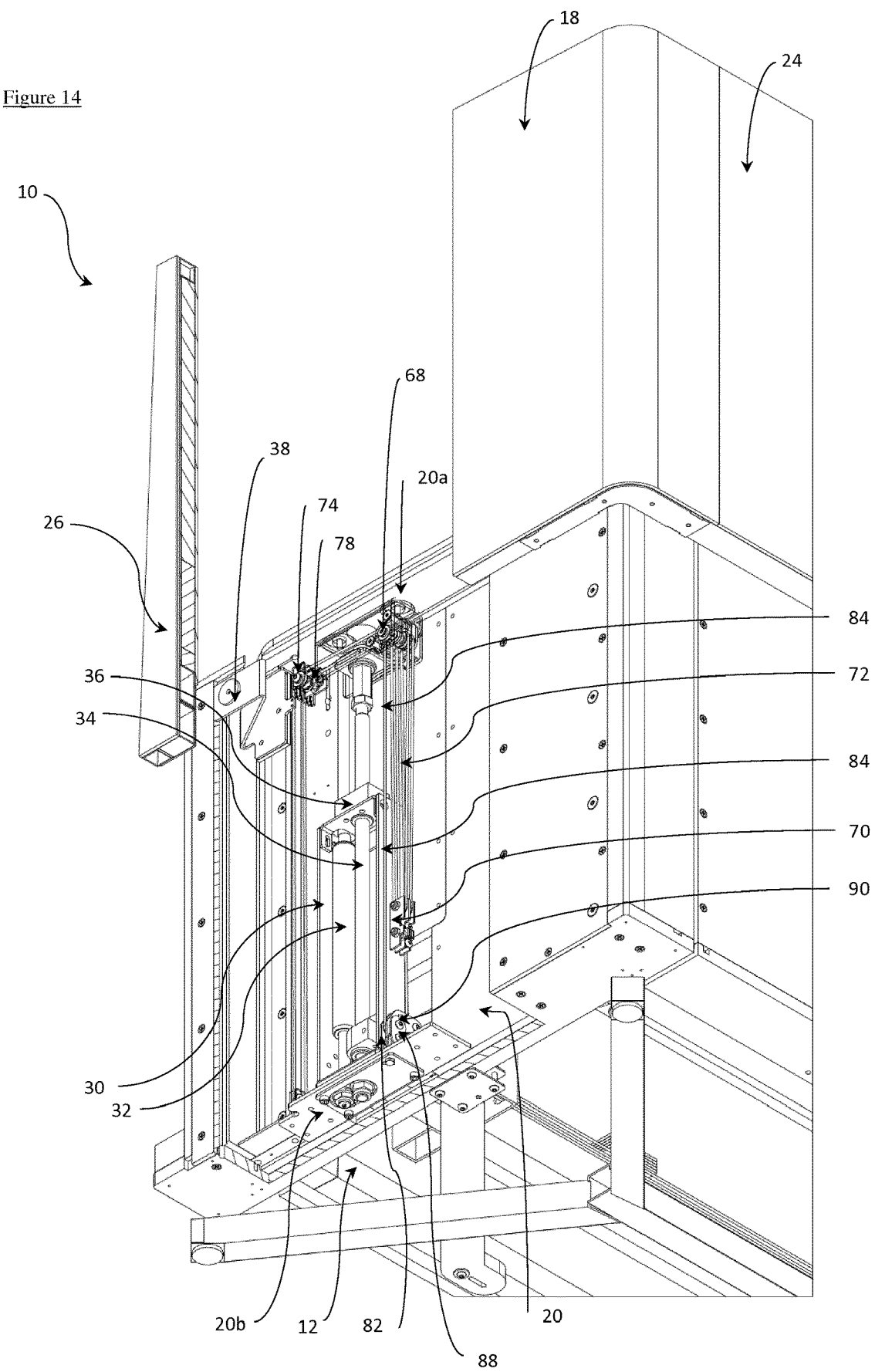
FIG. 14 shows an isometric view of the seat of FIG. 11 from the left side with the left wing of the screen removed and the privacy screen in the raised position.

In FIGS. 8 and 10, the seat slider 30 has moved vertically downwards along the guide member 34, causing the piston 32 to compress. The screen slider 38 has moved vertically upwards along the rail 42.

Figure 9:
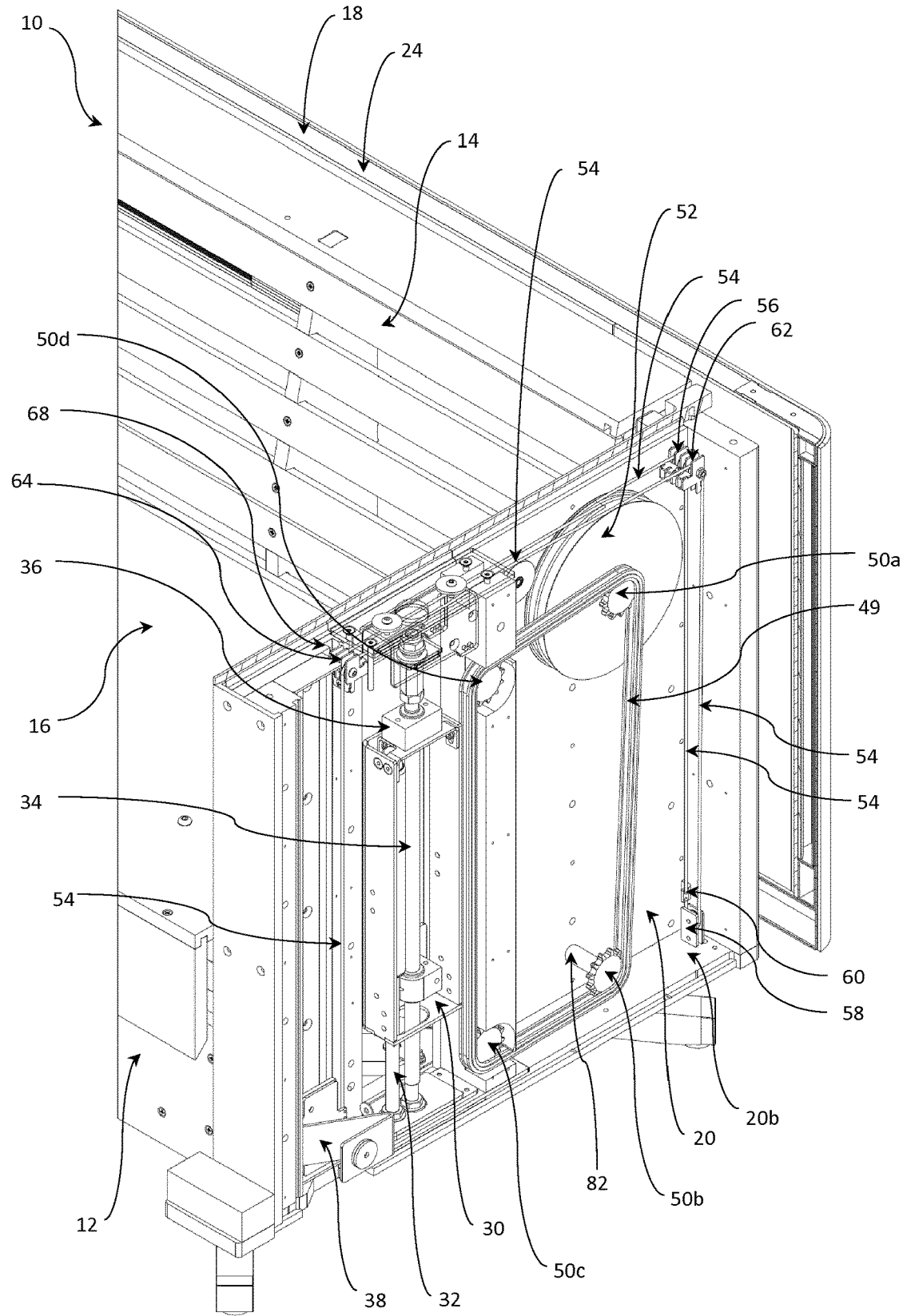
FIG. 9 shows an isometric view of the seat of FIG. 1 from the left side with the left wing of the screen removed and the privacy screen in the lowered position.

Referring again to FIGS. 7 and 9, the left frame side 20 includes a belt 49 attached to the seat slider 30. The link between the belt 49 and the slider 30 is indicated at 31. The belt 49 engages four sprockets: an upper right sprocket 50a, a lower right sprocket 50b, a lower left sprocket 50c and an upper left sprocket 50d. The belt 49 forms a closed loop around the sprockets 50. The sprockets 50 tension the belt 49. The upper left sprocket 50d is situated directly above the lower left sprocket 50c. The portion of the belt 49 which passes between the upper left sprocket 50d and the lower left sprocket 50c is substantially vertical, so that the link 31 and the part of the belt 49 joined to it moves vertically with seat slider 30.

A shaft 82 rotationally couples cog 50b of the right frame side to cog 50b of the left frame side. This ensures that the lifting mechanisms on both the left and right frame sides run exactly together, so that the screen remains substantially horizontal during lifting. It may be the case that the downward force on the seat slider on one side is greater than the force on the other, due to a person sitting on the seat (which could be a two or three person sofa seat, for example) at a point further towards one side of the seat than the other. The shaft 82 couples together the drivetrains on the left and right sides, to ensure that any excess force on one side is transmitted to the other. The mechanism is then balanced between the two sides and the screen will lift at the same rate on both sides, without any twisting forces in the screen or jamming on the sliders.

The upper right sprocket 50a is rotationally coupled to a reel 52. The reel 52 has a diameter of five times that of the sprocket 50a. A tensioned cable 54 engages the reel 52. Both ends of the tensioned cable 54 are attached to the reel 52. The tensioned cable 54 and reel 52 form a closed loop. In this embodiment there is a break in the cable (or two ends of an otherwise continuous cable) and each end is attached to the reel. However, in other embodiments one cable in a continuous loop could just be wrapped around the reel. It may still be preferable to fix the cable at some point onto the reel to avoid any slippage of the cable on the reel, but in some embodiments it may be preferred just to rely on the friction of the cable against the reel.

The tensioned cable 54 passes from the reel 52 towards the back of the seat 10 to a roller 56. The tensioned cable 54 passes over the roller 56 and vertically downwards to the bottom of the frame side 20. A second screen slider 60 (not shown in FIG. 10) is attached to the tensioned cable 54 below the roller 56. The second screen slider 60 moves vertically substantially between the top and bottom of the frame side 20. Below the second screen slider 60, the tensioned cable 54 passes under a roller 58. The roller 58 is attached to the lower wall 20b of the frame side 20. The tensioned cable 54 then passes vertically upwards to a roller 62 which is coaxial with the roller 56 but rotates independently (in use, rollers 62 and 56 will always rotate in opposite directions, due to the arrangement of the single cable 54). The rollers 62 and 56 are attached to the upper wall 20a of the frame side 20. The tensioned cable 54 passes over the roller 62 and horizontally along the top of the frame side 20, from the back of the seat 10 to the front of the seat 10. At the top front corner of the frame side 20, the tensioned cable 54 passes over a roller 64 and then vertically downwards to the bottom of the frame side 20. The screen slider 38 is attached to the tensioned cable 54 below the roller 64. The tensioned cable 54 passes under a roller 66 at the bottom of the frame side 20. The roller 66 is fixed to the lower wall 20b of the frame side 20. The tensioned cable 54 then passes vertically upwards to the top of the frame side 20 and over a roller 68, which is coaxial with the roller 64 but free to rotate independently (and due to the arrangement of the cable 54 the rollers 68, 64 will always rotate in opposite directions in use). The tensioned cable 54 then passes horizontally along the top of the frame side 20 and back to the reel 52.

When the screen 18 is in the lowered position, the part of the tensioned cable 54 that passes from the reel 52 towards the front of the seat 10 is wound around the reel 52. When the screen moves from the lowered position to the raised position, the reel 52 rotates counter-clockwise as viewed in FIGS. 9 to 12. This pays out tensioned cable 54 towards the front of the seat 10 and demands tensioned cable from roller 56. This causes the tensioned cable 54 to pull sliders 60 and 38 upwards, causing the screen 18 to rise.

The mechanism as described ensures that the screen rises consistently, with movement level and equal in the front-to-back direction, due to the single continuous tensioned cable (or at least, multiple cables connected together so that they behave as one) which lifts the first and second screen sliders, at the front and back, together. The mechanism also ensures that the screen is level and moves together in a side-to-side direction, without excess force on one side causing twisting forces in the screen itself. This is achieved by linking the drivetrains together via a shaft running underneath the seat squab, between two opposing sprockets which in turn are connected to the belt.

Referring now to FIGS. 11 to 14, the left frame side 20 and the drivetrain contained within will now be described in relation to a second embodiment of the invention. Features with like numerals are common with the first embodiment. The right frame side 22 is a mirror image of the left frame side 20.

The drivetrain on each side again involves a tensioned cable 72. On each side, an end of the tensioned cable may be anchored to the seat squab, preferably at a central point underneath the seat squab. In other embodiments the end could be anchored to the frame. Alternatively, a single continuous cable may be provided for the drivetrain on both sides, the cable passing all the way under the seat squab so that in effect the end of the cable of the drive train on one side is anchored to the end of the cable of the drive train on the other side. In this particular embodiment, there is in effect a single continuous cable but there is a restriction on how far the centre of the single cable can move with respect to the frame. This is described in greater detail below.

The left frame side 20 of the second embodiment includes an upper pulley block 68. The upper pulley block 68 is fixed relative to the frame 12. The frame side 20 also includes a lower pulley block 70 which is fixed to the slider 30. A tensioned cable 72 is wound multiple times around and between the pulley blocks 68, 70. The pully blocks and multiple cable runs form a displacement multiplier so that the screen can be caused to move further than the distance moved by the seat squab. Preferably, the ratio is around four or five times.

The tensioned cable 72 passes from the upper pulley block 68 along the top of the frame side 20 towards the front of the frame side 20 to a roller 74. The roller 74 is fixed relative to the frame 12. The roller 74 is attached to the upper wall 20a of the arm 20. The tensioned cable 72 passes over the roller 74 and vertically downwards towards the bottom of the frame side 20.

The slider 38 is attached to the tensioned cable 72 below the roller 74. There is a break in the cable 72 which is bridged by the slider 38 (alternatively there could be just a single cable with the slider 38 fixed to it). As the cable moves, the slider moves as well.

The tensioned cable 72 then passes below a roller 76 at the bottom of the frame side 20 and vertically upwards towards the top of the frame side 20. The roller 76 is fixed relative to the frame 12.

Near the top of the arm 20, the cable 72 passes over a roller 78 and horizontally along the top of the frame side 20 towards the back of the frame side 20. The roller 78 is fixed relative to the frame 12. The roller 78 is co-axial with the roller 74 but can rotate independently.

The cable 72 extends to the back of the frame side 20 and passes over a roller 80 at the back-top corner of the arm 20. The roller 80 is fixed relative to the frame 12.

The tensioned cable 72 then passes vertically downwards towards the bottom of the frame side 20. The end of the tensioned cable 72 is fixed to the bottom of the screen 18.

Figure 15:
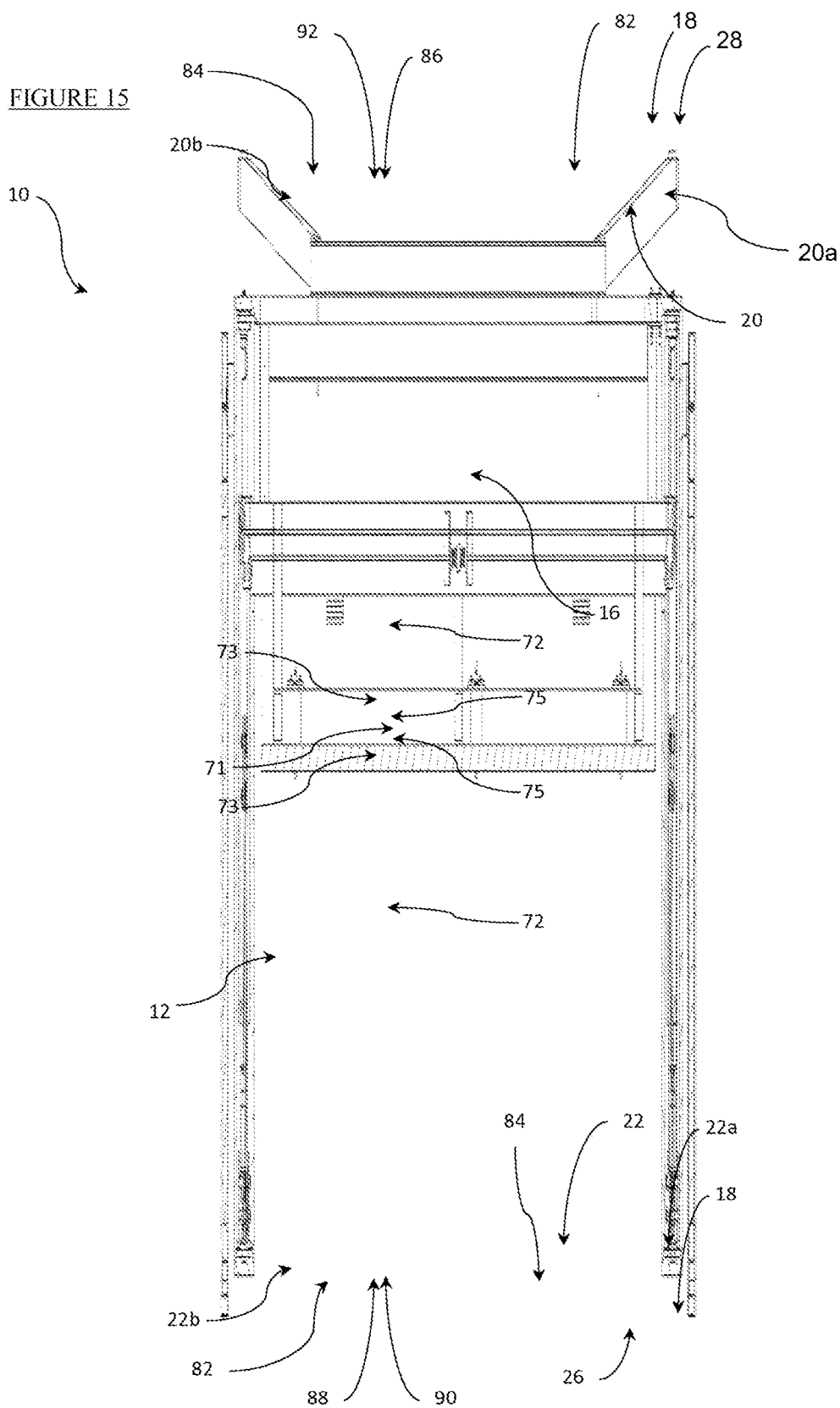
FIG. 15 shows a cross-sectional view from behind of the seat of FIG. 11 with the privacy screen in the lowered position and the backrest removed.
Figure 16:
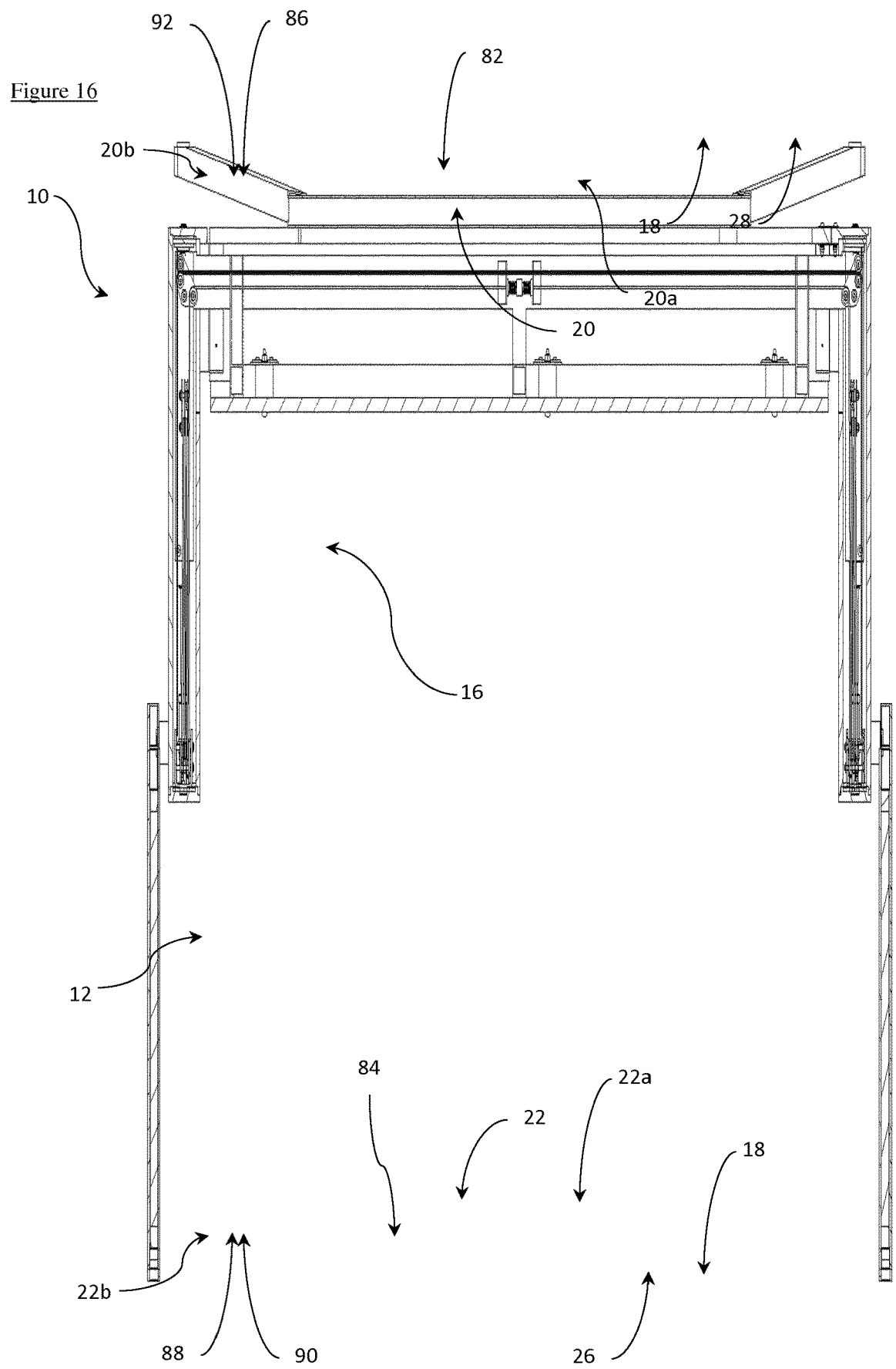
FIG. 16 shows a cross-sectional view from behind of the seat of FIG. 11 with the privacy screen in the raised position and the backrest removed.
Figure 17:
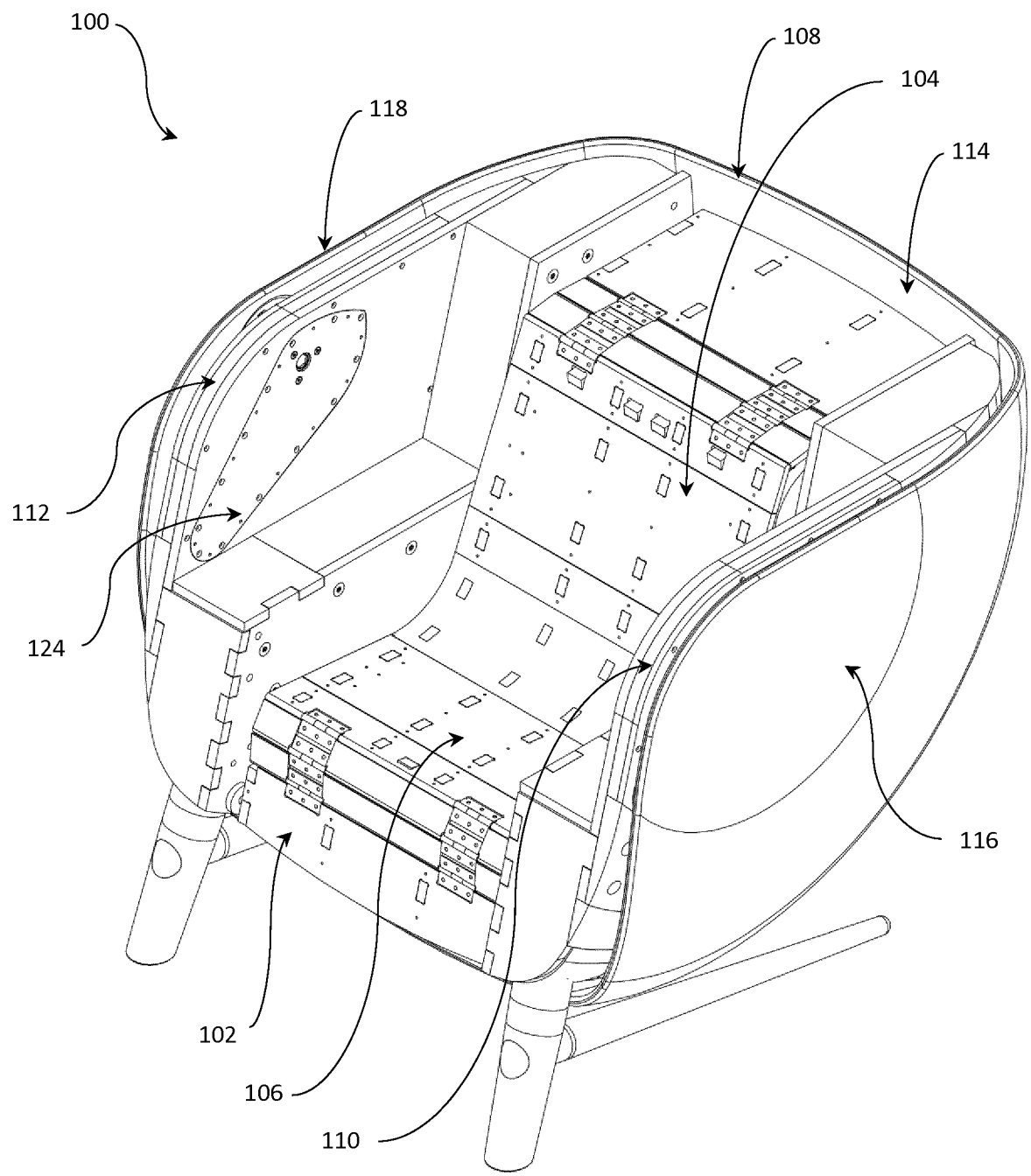
FIG. 17 shows an isometric view of a third embodiment of a seat with a privacy screen with the screen in the lowered position.
Figure 18:
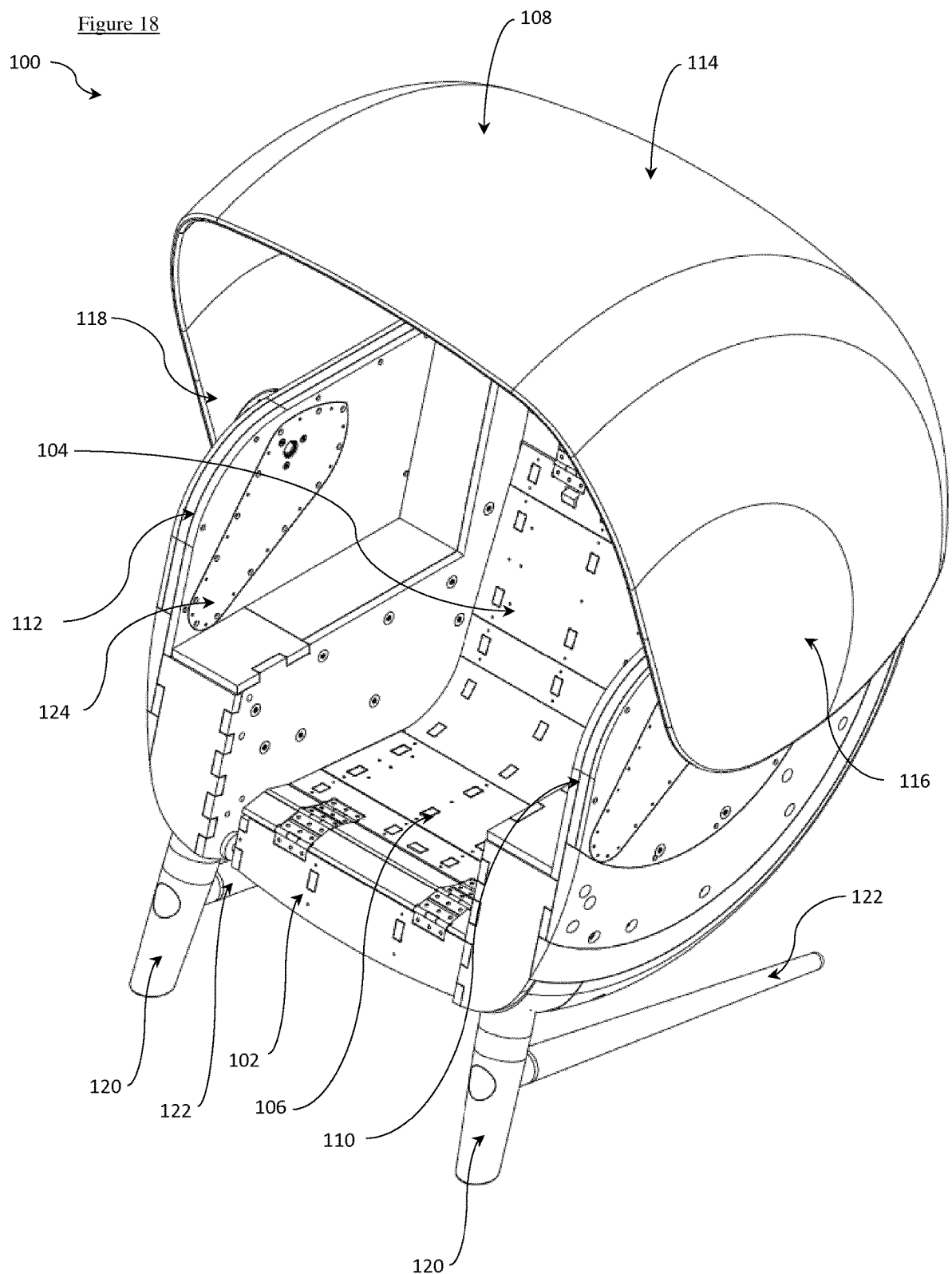
FIG. 18 shows an isometric view of the seat of FIG. 17 with the screen in the raised position.

Referring now to FIGS. 15 and 16, a levelling arrangement of the second embodiment of the seat 10 will now be described. The plane of the cross-section in FIGS. 15 and 16 is parallel to the plane of the central portion of the screen 24 and in the centre of the seat 10. The view is from behind the seat.

A first levelling cable 82 extends from the top of the left frame side 20, vertically downwards to a roller 86. The roller 86 is attached to the seat slider 30 of the left frame side 20. The first levelling cable 82 passes under the roller 86 and then horizontally beneath the bottom of the squab 16 to a roller 88. The roller 88 is attached to the seat slider 30 of the right frame side 20. The first levelling cable 82 passes over the roller 88 and then vertically downwards to the bottom of the right frame side 22. An end of the second levelling cable 82 is fixed to the lower wall 22b of the right frame side 22.

A second levelling cable 84 extends from the top of the right frame side 22 vertically downwards to a roller 90. The roller 90 is attached to the seat slider 30 of the right frame side 22. The second levelling cable 84 passes under the roller 90 and then horizontally beneath the bottom of the squab 16 to a roller 92. Note that in FIGS. 15 and 16, the horizontal portion of the cables 82, 84 appear as a single line, one is obscured behind the other. Also, rollers 86, 92 and 88, 90, although they look very close together in the drawing, are separated in the direction into/out of the page, and do not touch each other. The roller 92 is attached to the seat slider 30 of the left frame side 20. The second levelling cable 84 passes over the roller 92 and then vertically downwards to the bottom of the left frame side 20. An end of the second levelling cable 84 is fixed to a lower wall 20b of the left frame side 20.

When weight is applied to the seat squab 16, tension in the levelling cables transmits force between the left and right sides of the seat squab 16 to ensure an even movement, to keep the seat squab completely horizontal and prevent any jamming in the mechanism, especially in the seat sliders. When the right of the seat squab 16 moves down, a downwards force is exerted by the second levelling cable 84 on roller 92, causing the left side of the seat squab 16 to also move down. When the left side of the seat squab 16 moves down, a downwards force is exerted by the first levelling cable 82 on roller 88, causing the right side of the seat squab 16 to also move down. This ensures that the seat squab 16 remains parallel to the ground and moves evenly even if a user places his weight only on one side of the seat.

Also visible in FIGS. 15 and 16 is the tensioned cable 72 which is the tensioned cable of the drivetrain on each side. The cable passes underneath the seat squab 16. The cable may be a single continuous cable or alternatively may be two cables joined together, substantially centrally underneath the seat squab 16. At the centre of the cable (or at the joint between the two cables), a block 71 is provided. Two stops 73 are provided. The stops 73 are fixed underneath the seat squab. Each stop 73 has an aperture which is large enough to allow the cable 72 to run freely through, but too small to allow the block 71 to pass. In this way, the centre of the cable 72 can move slightly, but is prevented from moving off centre further than half the distance between the stops 73. Springs 75 are provided between the block 71 and each stop 73, to urge the block into a substantially central position, between the stops 73, when there is no external weight on the seat squab causing uneven tension in the cable 72.

Referring now to FIGS. 17 to 20, a third embodiment of a seat is indicated generally at 100. The third embodiment includes a frame 102, a backrest 104, a movable seat squab 106 and a movable screen 108.

The seat also has left and right frame sides 110 and 112. The frame sides 110, 112 form part of the fixed frame 102. Left and right are defined from the point of view of a person sitting on the seat with his back to the backrest 104. The screen 108 includes a curved central portion 114, a left wing 116 and a right wing 118. The central portion 114 is curved to conform to the back of the frame 102, which is also curved, and is disposed behind the frame 102. The left wing 116 and right wing 118 are parallel and are substantially quarter-circles, their curved edges being joined to the curved edges of the central portion 114.

To move from the lowered position to the raised position, the screen 108 pivots about the frame 102. The screen 108 pivots about an axis which is perpendicular to the plane of the drawings in FIGS. 19 and 20 and passes through the point marked X in those figures. The screen 108 is connected to the frame by a pin or short axle. In the lowered position, the central portion of the screen 114 curves around the rear and bottom of the seat.

A pair of legs 120 is provided. The legs join the bottom of the frame 102 near to the front of the seat. Each leg includes a cantilever 122 which extends backwards from the leg 120 to contact the floor and support the leg 120 in an upright position.

Figure 19:
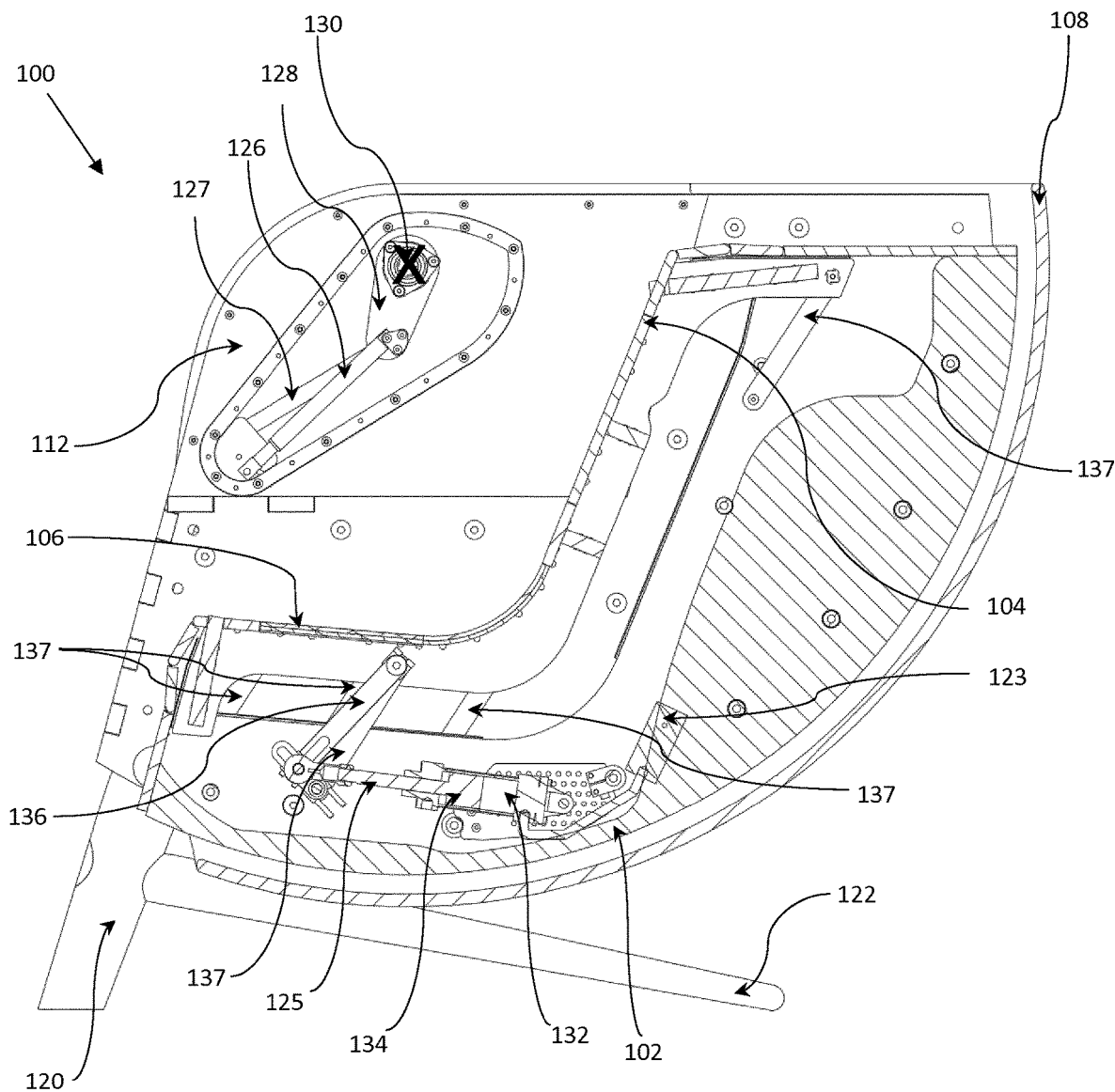
FIG. 19 shows a cross-sectional side view of the seat of FIG. 17 with the screen in the lowered position.
Figure 20:
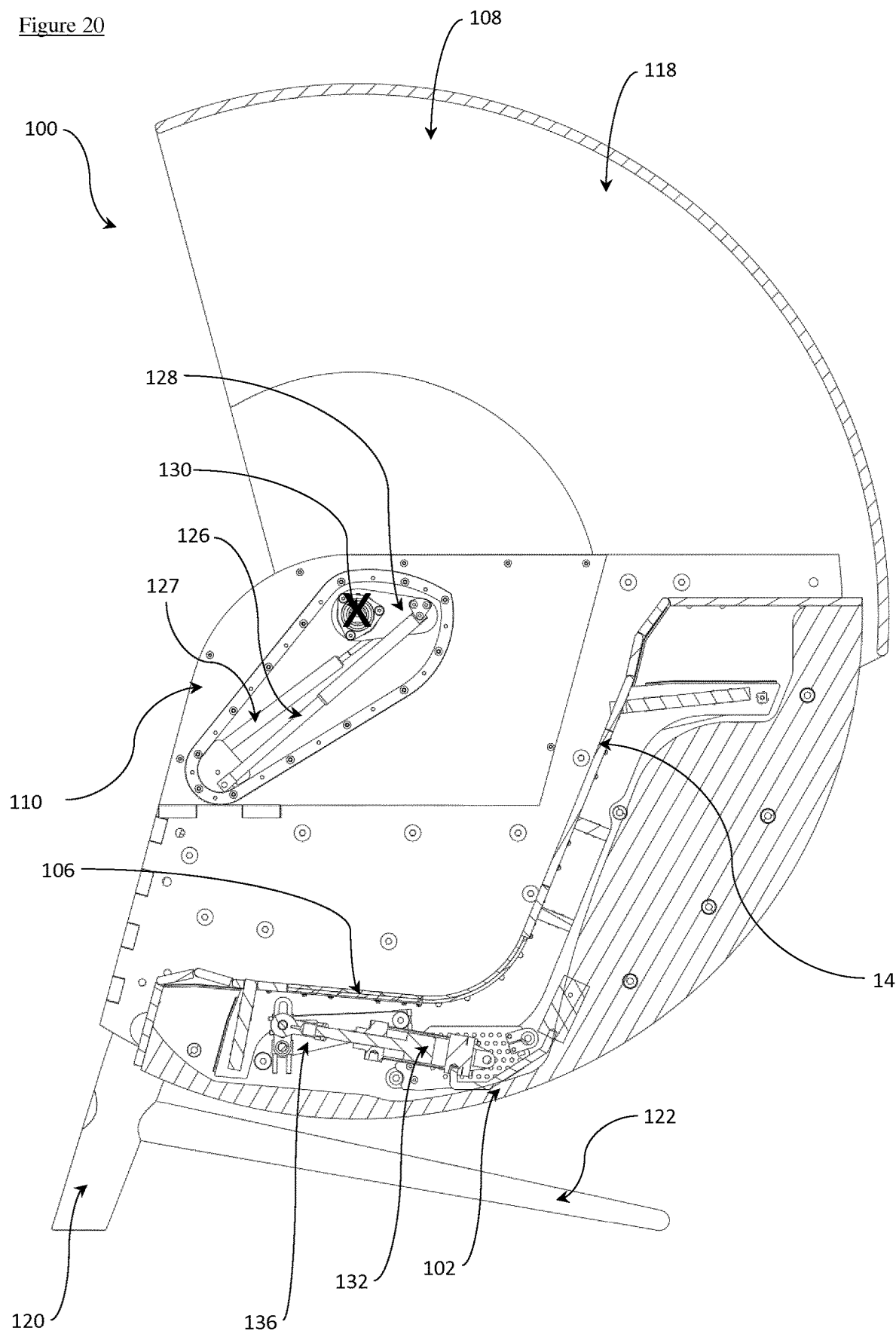
FIG. 20 shows a cross-sectional side view of the seat of FIG. 17 with the screen in the raised position.

The plane of the cross-section of FIGS. 19 and 20 is perpendicular to the central portion of the screen 108. A panel 124 (FIG. 18) has been removed from the left face of the right frame side 112. The left frame side 110 is a mirror image of the right frame side 110.

An actuator piston 126 is provided in the right frame side 112 behind the panel (124). The actuator piston 126 is attached at a first end to the frame side 112 and at a second end to a cam 128. The cam 128 and piston 126 are disposed within the left frame side 112. The cam 128 is rotationally fixed to a shaft 130. The shaft 130 passes through an outer wall of the left frame side 112 and is fixed to the right wing 118.

A gas spring 127 is provided proximal to the actuator piston 126. The gas spring is fixed at one end to the frame side 112 and at the other end to the cam 128. The gas spring 127 provides a pre-load on the screen, to reduce the force (and therefore the weight of the person) required to move the screen. The gas spring 127 has in effect the same purpose as the counterweight 44 of the seat 10.

The gas spring 127 also provides a small amount of damping to control the movement of the screen. The actuation cylinder 126 is of a known type which can push out and provide force when hydraulic fluid is forced into the cylinder, but if the cylinder 126 is manually pulled out (e.g. by picking up the screen 108 manually) then the cylinder will not work in the other direction, i.e. it will not draw in hydraulic fluid and will not have any effect on the piston 134 or the seat squab 106. This is done to prevent damage which could otherwise be caused by sucking air into the hydraulic system, if the screen 108 were to be moved manually. However, it also means that there is very little resistance to manually moving the screen, since the drivetrain is effectively disengaged when the screen is manually moved. This means that when released, the potentially heavy screen could fall down quickly, which may cause injury or damage. The gas spring 127 provides some damping in both directions, to mitigate this issue.

A hydraulic cylinder 132 is disposed below the seat squab 106. The hydraulic cylinder 132 includes a piston 134 and a piston rod 125. The piston rod 125 is connected to the seat squab 106 by a linkage 136. The hydraulic cylinder 132 is connected to each actuator piston 126 by a hydraulic hose (not shown).

When a user sits on the seat squab 106, the linkage 136 causes the piston 134 to move into the cylinder 132. This increases the pressure of the fluid within the cylinder 132. The increased pressure is transmitted from the cylinder 132 to the actuator pistons 126, causing them to extend and apply a torque to the screen 108 via the cams 128.

In this third embodiment, the whole seat, i.e. the seat squab and the backrest, moves downwards and slightly backwards to cause the screen to rise. The seat is mounted to the frame on levers 137, seen in FIG. 19 near the top of the backrest and near the front of the seat squab. The user perception is therefore of "sinking" slightly back into the seat.

Some resistance may be provided in the hydraulic circuit by means of a restriction on the hydraulic hose. This may be provided by a restrictor device 123. The restrictor device is manually adjustable, for example by a screw, to reduce or increase the restriction. The restrictor device 123 can be set on manufacture or installation to "tune" the resistance in the drivetrain, which in turn will control the speed of movement when a person sits on the seat.

Figure 21A:
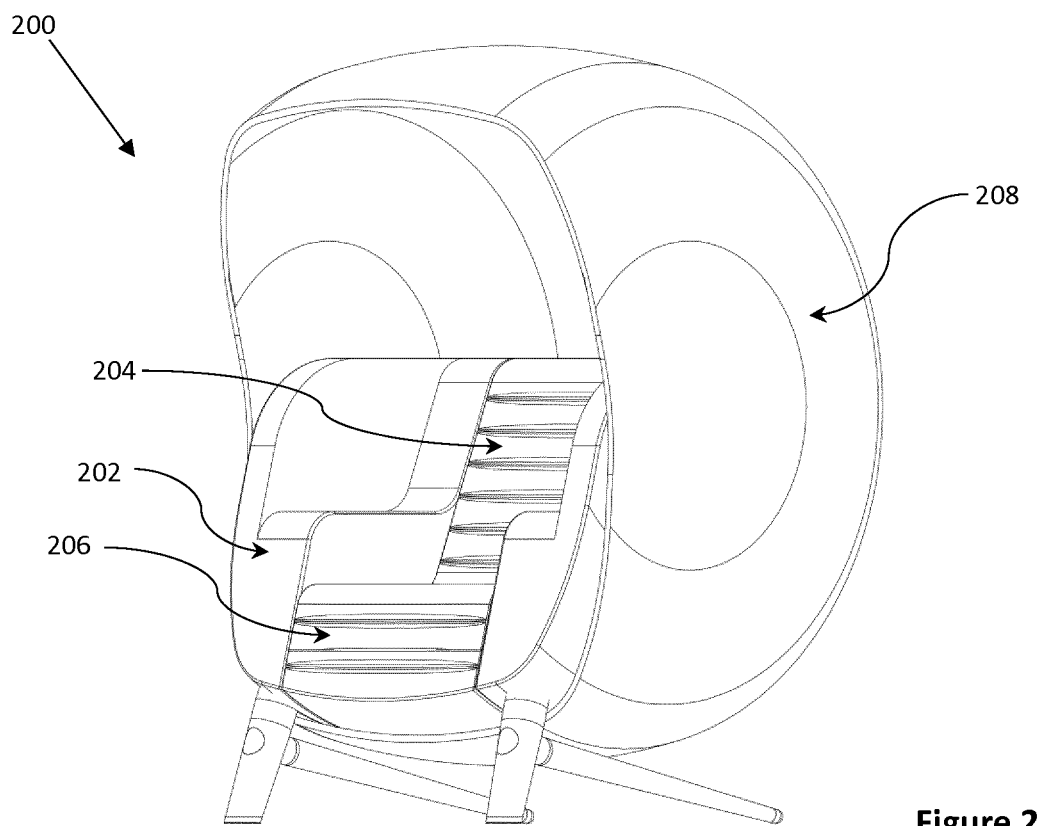
FIG. 21a shows another embodiment of a seat having a screen, the screen being in an open position.
Figure 21B:
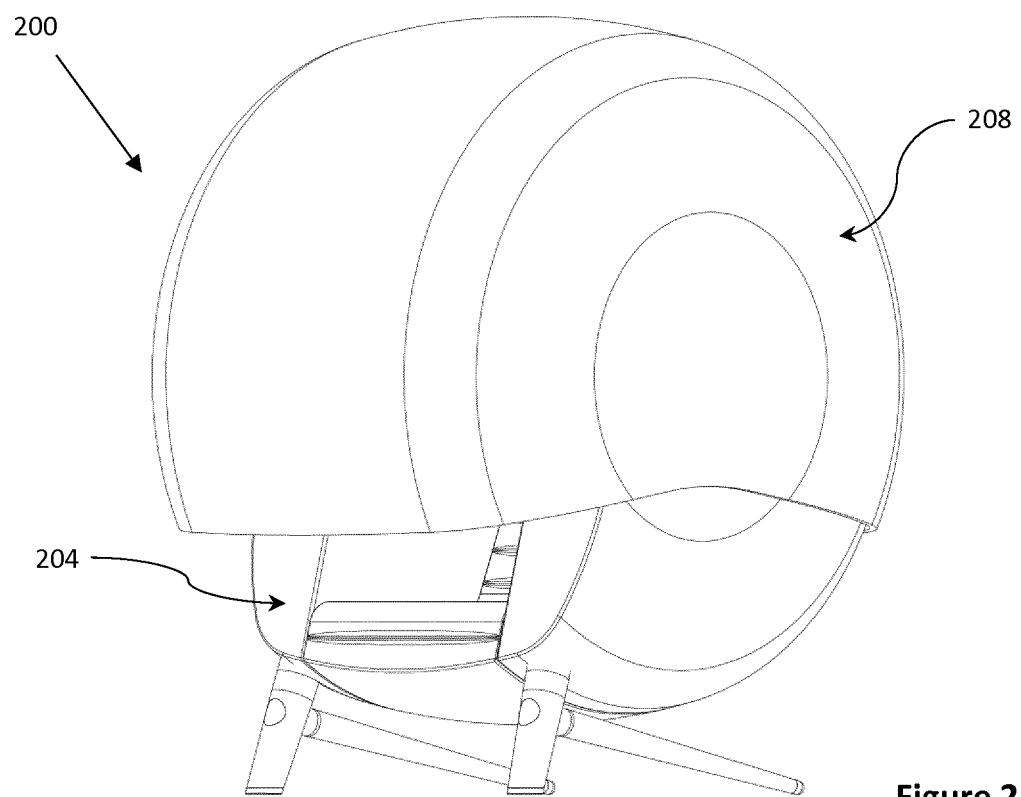
FIG. 21b shows the seat of FIG. 21a, with the screen in the closed position.

Referring now to FIGS. 21*a* and 21*b*, a further embodiment is indicated at 200. The seat 200 in this case is very similar to the seat 100, but has an extended screen 208. In an open position, shown in FIG. 21*a*, the screen 208 rests around the back and sides of the fixed frame 202. Part of the screen 208 extends above the frame 202 to form a hood over the seat, but a person can still enter the seat and sit down from the front. When a person sits down, the backrest 204 and squab 206 move downwards and backwards, and as they do so, the screen pivots to close the front of the seat and provide a cover around all sides, as shown in FIG. 21*b*.

This embodiment may be suitable when an enhanced level of privacy is required for a single person, for example to make a personal phone call in an open-plan office. In some embodiments, a display screen or projection may be provided on an inner surface of the screen 208, facing the user. The seat 200 may therefore be used, for example to watch a movie or take part in a videoconference. Cameras, microphones, and speakers could be provided as well.

Other embodiments may have an articulated screen. In this way, a seat could be made which has a screen which passes around the back, sides and front, like the seat 200, but which folds down so that in an open position the seat is not substantially screened at all, like the seat 100.

Figure 22:
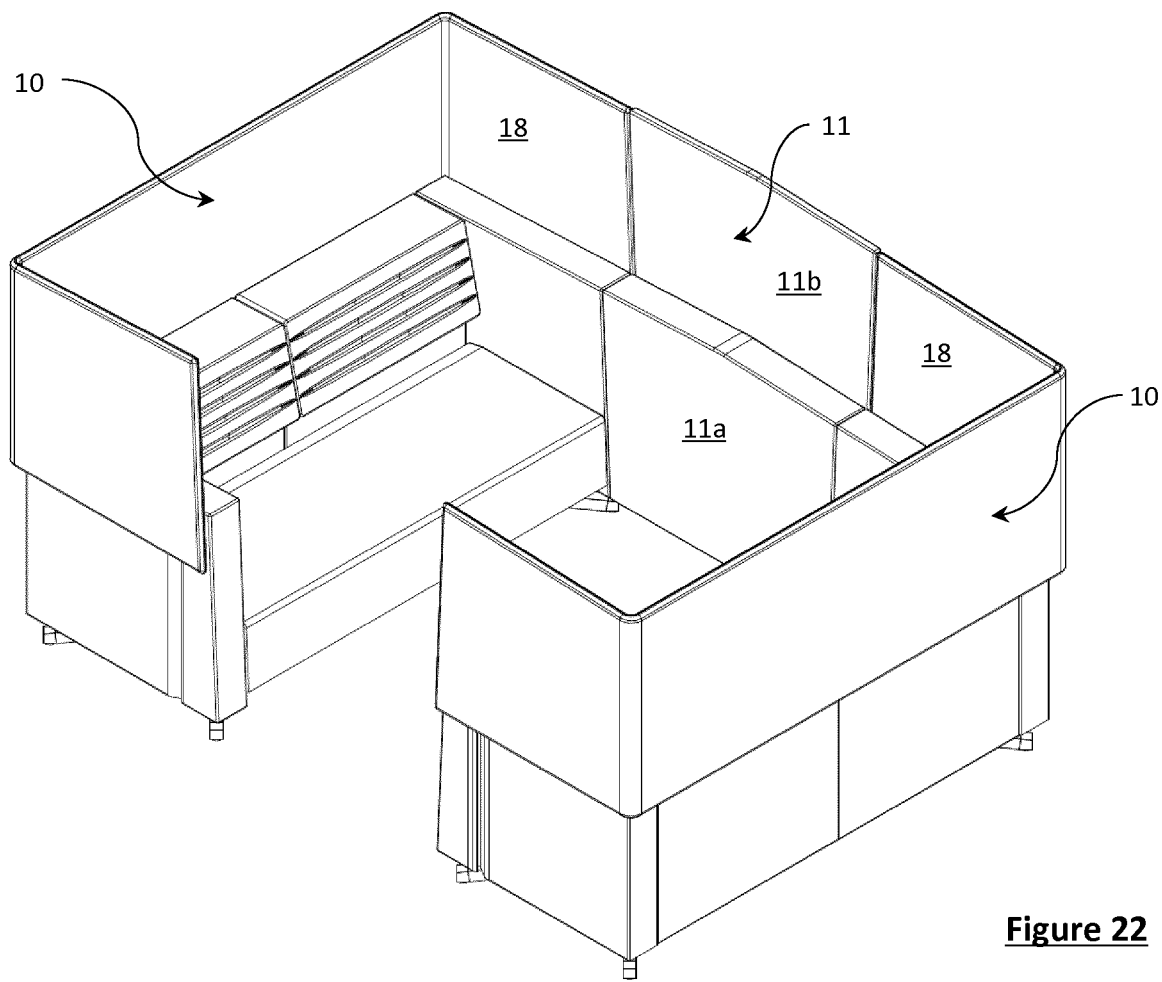
FIG. 22 shows two of the seats of FIG. 1, coupled together by a linking piece.

FIG. 22 shows two seats similar to those of FIG. 1, joined by a linking piece 11. The linking piece 11 includes a frame 11*a* and a movable screen 11*b*. The movable screen 11*b* of the linking piece is coupled to the movable screens 18 of each of the seats 10. The seats 10 each have the power assistance mechanism as described below and shown in FIG.

23. Therefore, when one person sits on one of the seats 10, the screen 18 of that seat will begin to rise. In turn this will pull up the screen 11b of the linking piece 11, and the screen 18 of the other seat 10.

In some embodiments, as well as an occupancy detector, a sensor may detect when there is movement in the drivetrain. The sensor may be provided by the motor itself. Upon a small movement, the power assistance mechanisms of both seats 10 will activate, so that all screens fully rise with minimal input effort. The linking piece 11 could be provided with a similar power assistance mechanism as well, but depending on the power of the motors in the seats 10, this may be unnecessary.

The skilled person will appreciate that other embodiments of the seats may be similarly coupled, either mechanically, hydraulically, or electrically, so that a person sitting on one seat in a group will cause all screens in the group to rise/close.

Figure 23:
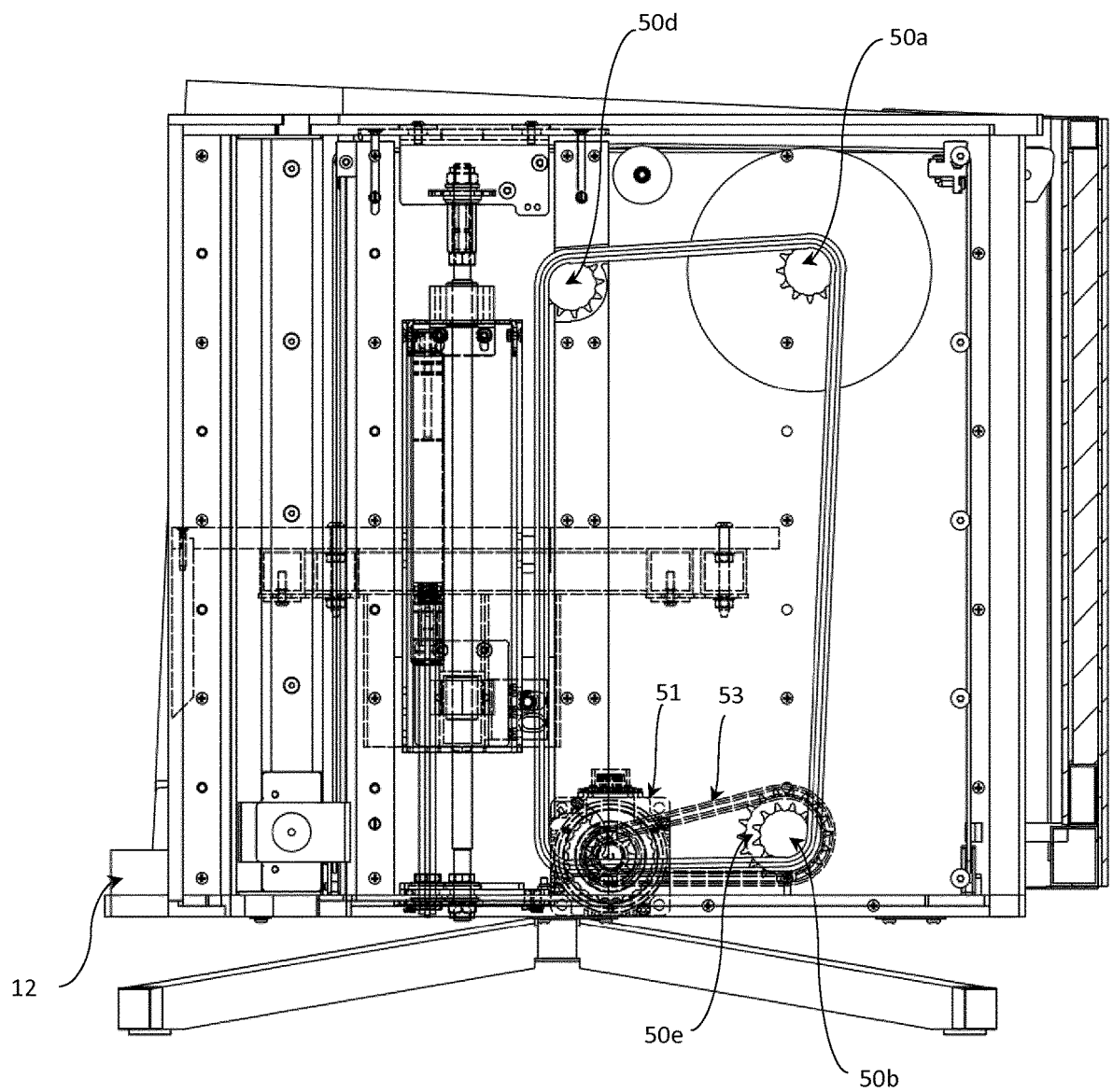
FIG. 23 shows a variation of the seat of FIG. 1, with an electrical power assist.

FIG. 23 shows a variation on the embodiment of FIGS. 7 to 10. An electric motor 51 is provided, positioned substantially centrally underneath the seat squab. The electric motor 51 is coupled via a belt or chain to a sprocket 50e, which is provided on the shaft (82). As an alternative, the electric motor might be positioned in one of the frame sides. When power is supplied to the motor, the drivetrain will be moved. As an alternative to a simple electric motor/generator, a stepper motor and/or a shaft encoder may be used, for precise monitoring and control of the position of the drivetrain at all times.

Figure 24:
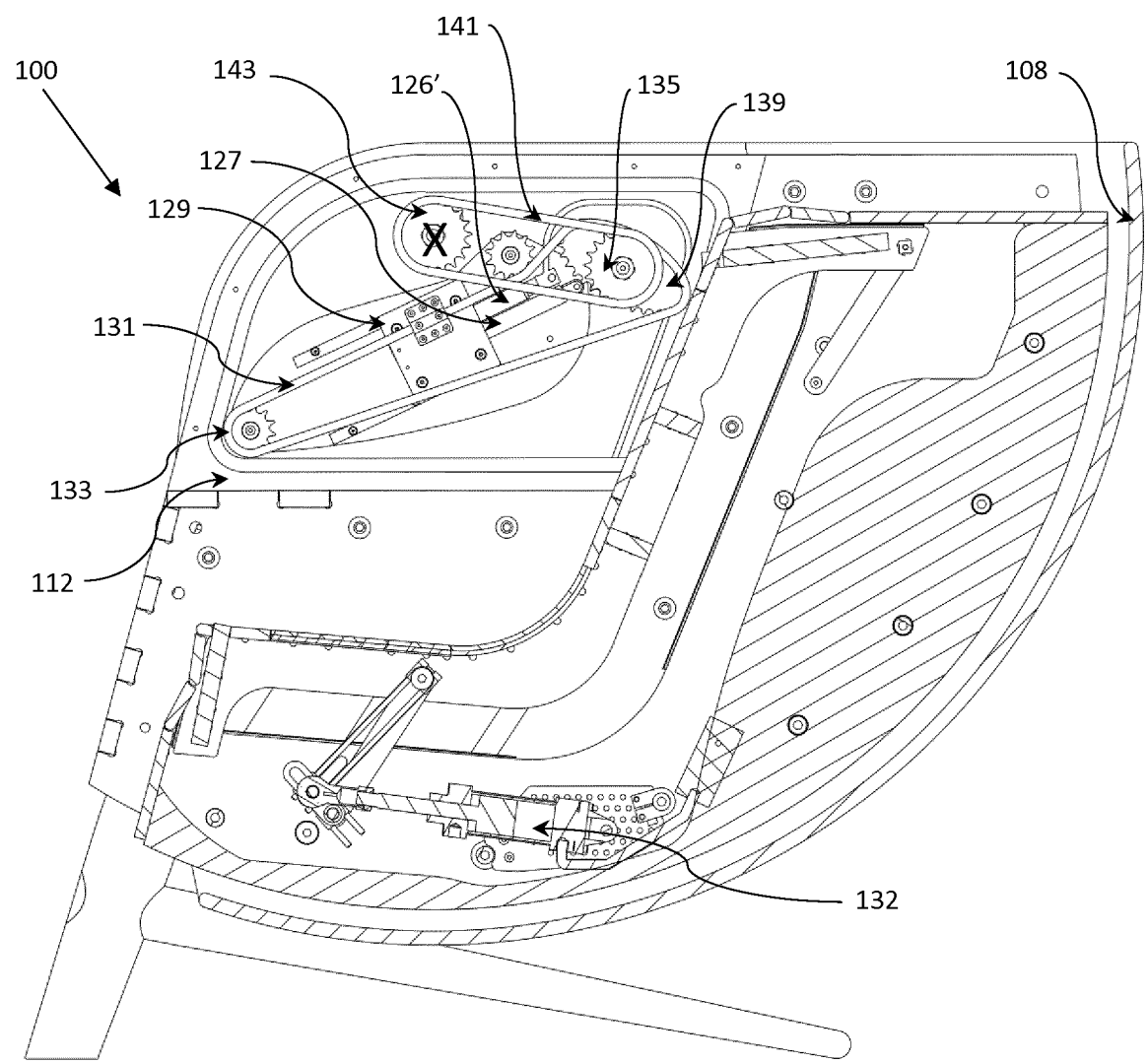
FIG. 24 shows a variation of the seat of FIG. 17, with a non-linear converter in the drivetrain.

FIG. 24 shows a variation on the embodiment of FIGS. 17 to 20. An actuator piston 126' is operated in exactly the same way hydraulically by the hydraulic cylinder 132 under the seat. However, the drivetrain between the actuator piston 126' and the pivoting screen 108 is different. The actuator piston 126' is connected at one end to the frame side 112 and at the other end to a slider 129. The slider is slidably mounted on rails which in turn are fixed to the frame side 112. A belt 131 is provided around sprockets 133 and 139, in a continuous loop. Between the sprockets, the belt 131 is fixed to the slider 129, so that when the slider 129 moves linearly, the belt moves clockwise or anticlockwise in its loop and turns the sprockets 133, 139.

Sprocket 139 is coaxial with and rotationally coupled to sprocket 135. In turn, sprocket 135 is linked via belt 141 to sprocket 143. Sprocket 143 is rotationally coupled to the axle on which the screen 108 pivots, and so the pivoting screen 108 is raised or lowered when sprocket 143 rotates.

Sprocket 139 is non-circular, in this embodiment it is elliptical. A non-circular sprocket in the drivetrain can be used to adjust the torque delivered to the screen 108, as the centre of effort moves as the screen 108 pivots. In the embodiment shown, the most effort is required to move the screen 108 when it is at about 50% of its motion, because the centre of mass of the screen is at the furthest horizontal distance from the pivot X at this point. The elliptic sprocket 139 ensures that more torque is delivered to the screen 108 at the point in its motion when the most torque is required to move it. The torque delivered to the screen 108 by the elliptic sprocket arrangement in terms of the angular displacement of the screen is substantially a sine curve.

In some embodiments, it may be desirable to further adjust the torque delivered to the screen over its travel, for example by changing the shape of sprocket 143, 135 to non-circular.

The embodiments described allow a person or persons to sit with a degree of privacy. Also, the raised/closed screen indicates when a seat is occupied to avoid unintentional interruption. Even for quite large seats, for example, two or three seat sofas, or even larger, the screen rises completely horizontally, as forces are balanced between the lifting mechanisms on either side, even where a person sits substantially to one side on the seat squab.

The embodiments described are examples only, and it will be understood that features from different embodiments may be combined to make alternative seats according to the invention. Other alternatives and modifications will be apparent. The invention is defined by the claims.

The invention claimed is:

1. A seat comprising:
 a) a frame,
 b) a backrest,
 c) a movable seat squab and
 d) a movable screen, the movable screen being movable between an open position and a closed position for providing privacy to a person sitting on the seat, downward motion of the seat squab causing motion of the movable screen from the open position to the closed position, in which the movable screen includes a central section, a first wing on a first side of the central section and a second wing on a second side of the central section, for enclosing the person sitting on the seat on three sides,
 wherein the backrest is fixed relative to the frame or the backrest is fixed relative to the seat squab, and wherein the open position of the movable screen is a lowered position, and the closed position of the movable screen is a raised position.

2. A seat as claimed in claim 1, in which a counterweight or preload is provided, for applying a force to the movable screen substantially in the opposite direction to the weight of the movable screen.

3. A seat as claimed in claim 1, in which at least one tensioned cable or cord is attached to the movable screen and is connected to the seat squab.

4. A seat as claimed in claim 3, in which each tensioned cable is attached to the front and rear of the left wing and the right wing of the movable screen.

5. A seat as claimed in claim 1, in which tensioned cable is provided on a first side of the seat and in which tensioned cable is also provided on a second side of the seat, for providing a connection between the squab and the movable screen on each side.

6. A seat as claimed in claim 5, in which the tensioned cable on one side is connected to the tensioned cable on the other side.

7. A seat as claimed in claim 6, in which the tensioned cable on each side passes underneath the seat squab to connect to the tensioned cable on the other side.

8. A seat as claimed in claim 5, in which the tensioned cable passes through a system of pullies to convert movement of the seat squab to movement of the movable screen, and in which a pully block is provided that moves with the seat squab and another pully block is provided fixed to the frame.

9. A seat as claimed in claim 8, in which the cable runs underneath the seat squab, between pully blocks on either side of the seat.

10. A seat as claimed in claim 9, in which the cable is anchored to the seat squab.

11. A seat as claimed in claim 9, in which the centre of the cable, underneath the seat squab, is free to move in the side-to-side direction.

12. A seat as claimed in claim 11, in which movement of the centre of the cable is constrained by stops.

13. A seat as claimed in claim 12, in which springs are provided for urging the centre of the cable towards the centre of the seat.

14. A seat as claimed in claim 1, in which a displacement multiplier is provided in the drivetrain between the seat squab and the movable screen, the displacement multiplier causing greater movement of the movable screen than movement of the seat squab, in which the displacement multiplier is in the form of a large diameter reel rotationally coupled to a small diameter sprocket.

15. A seat as claimed in claim 1, in which a drivetrain is provided between the seat squab and the movable screen on one side of the seat, and a similar drivetrain is provided on the other side of the seat between the seat squab and the movable screen, the drivetrains being coupled together.

16. A seat as claimed in claim 1, in which two levelling cords or cables are provided, a first levelling cable being attached to an upper part of the first side of the frame and a lower part of the second side of the frame, and a second levelling cable being attached to an upper part of the second side of the frame and a lower part of the first side of the frame.

17. A seat as claimed in claim 1, in which the force delivered to the movable screen is variable over the travel of the movable screen from the open position to the closed position, and in which an elliptic sprocket rotationally coupled to a circular sprocket is provided as part of the drivetrain between the seat squab and the movable screen.

18. A seat as claimed in claim 1, in which a power assist mechanism is provided, the power assist mechanism including an electric motor coupled to part of the drivetrain between the seat squab and the movable screen, and in which occupancy of the seat as detected by an occupancy detector will cause rotation of the electric motor, and in which rotation of the electric motor will cause motion of the seat squab and motion of the movable screen.

19. A seat as claimed in claim 18, in which a control unit is provided, the control unit being adapted to detect motion of the seat squab and, on detecting motion, supply power to the electric motor to assist with movement of the movable screen.

* * * * *